US010826339B2

(12) United States Patent
Tateishi et al.

(10) Patent No.: US 10,826,339 B2
(45) Date of Patent: Nov. 3, 2020

(54) MOTOR, MOTOR CONTROL METHOD AND MOTOR CONTROL DEVICE

(71) Applicant: ASMO CO., LTD., Shizuoka-ken (JP)

(72) Inventors: Yoko Tateishi, Kosai (JP); Yoshiaki Takemoto, Toyohashi (JP); Masashi Matsuda, Kakegawa (JP); Hironari Suzuki, Kosai (JP); Seiya Yokoyama, Toyohashi (JP); Shigemasa Kato, Toyohashi (JP); Kazunori Shimada, Toyohashi (JP); Takahiro Tsuchiya, Toyohashi (JP)

(73) Assignee: DENSO CORPORATION, Kariya (JP)

( * ) Notice: Subject to any disclaimer, the term of this patent is extended or adjusted under 35 U.S.C. 154(b) by 180 days.

(21) Appl. No.: 15/541,139

(22) PCT Filed: Aug. 18, 2016

(86) PCT No.: PCT/JP2016/074094
§ 371 (c)(1),
(2) Date: Jun. 30, 2017

(87) PCT Pub. No.: WO2017/033827
PCT Pub. Date: Mar. 2, 2017

(65) Prior Publication Data
US 2018/0152064 A1 May 31, 2018

(30) Foreign Application Priority Data

Aug. 21, 2015 (JP) .................................. 2015-163697
Sep. 10, 2015 (JP) .................................. 2015-178647
(Continued)

(51) Int. Cl.
*H02K 1/24* (2006.01)
*H02K 3/52* (2006.01)
(Continued)

(52) U.S. Cl.
CPC ............... *H02K 1/243* (2013.01); *H02K 1/14* (2013.01); *H02K 1/145* (2013.01); *H02K 1/24* (2013.01);
(Continued)

(58) Field of Classification Search
CPC ...... H02K 21/145; H02K 1/145; H02K 1/226; H02K 1/2706; H02K 1/243; H02K 1/2733; H02K 1/2713
(Continued)

(56) References Cited

U.S. PATENT DOCUMENTS 2,548,633 A 4/1951 Stephenson
6,046,519 A 4/2000 Hanazumi et al.
(Continued)

FOREIGN PATENT DOCUMENTS

CN 202034872 U 11/2011
CN 104811005 A 7/2015
(Continued)

OTHER PUBLICATIONS

International Preliminary Report on Patentability for Application No. PCT/JP2016/074094, dated Feb. 27, 2018 (7 pgs).
(Continued)

*Primary Examiner* — Forrest M Phillips
(74) *Attorney, Agent, or Firm* — Patterson Thuente Pedersen, P.A.

(57) ABSTRACT

This motor includes a two-layer rotor, a two-layer stator and a control unit. An A-phase rotor includes a pair of rotor cores and a field magnet. A B-phase rotor includes a pair of rotor cores and a field magnet. An A-phase stator includes a pair of stator cores and an A-phase winding. A B-phase stator includes a pair of stator cores and a B-phase winding. The control unit controls an A-phase input voltage applied to the A-phase winding, and a B-phase input voltage applied to the
(Continued)

B-phase winding. The relative arrangement angle of the A-phase stator and the A-phase rotor relative to the B-phase stator and the B-phase rotor is set to an electrical angle of 90 degrees. The control unit applies a leading phase angle to the basic voltage waveforms of the A-phase input voltage and the B-phase input voltage, to set the energization width to at most 180 degrees.

15 Claims, 15 Drawing Sheets

(30) Foreign Application Priority Data

Nov. 2, 2015 (JP) .................................. 2015-216019
Aug. 9, 2016 (JP) .................................. 2016-156524

(51) Int. Cl.
| | |
|---|---|
| H02K 1/14 | (2006.01) |
| H02K 29/08 | (2006.01) |
| H02K 37/14 | (2006.01) |
| H02K 1/27 | (2006.01) |
| H02K 21/24 | (2006.01) |
| H02K 11/215 | (2016.01) |
| H02K 11/33 | (2016.01) |
| H02P 6/15 | (2016.01) |
| H02K 21/14 | (2006.01) |

(52) U.S. Cl.
CPC ............ *H02K 1/27* (2013.01); *H02K 1/2713* (2013.01); *H02K 3/522* (2013.01); *H02K 11/215* (2016.01); *H02K 11/33* (2016.01); *H02K 21/14* (2013.01); *H02K 29/08* (2013.01); *H02K 37/14* (2013.01); *H02P 6/15* (2016.02); *H02K 2203/03* (2013.01)

(58) Field of Classification Search
USPC ..................................................... 310/156.69
See application file for complete search history.

(56) References Cited

U.S. PATENT DOCUMENTS

| | | | |
|---|---|---|---|
| 9,887,608 B2* | 2/2018 | Takemoto | .............. H02K 1/145 |
| 10,141,821 B2* | 11/2018 | Takemoto | ............ H02K 1/2713 |
| 2001/0048251 A1 | 12/2001 | Ieoka | |
| 2007/0057514 A1 | 3/2007 | Mukai et al. | |
| 2010/0181865 A1* | 7/2010 | Oh | ........ H02K 21/145 |
| | | | 310/257 |
| 2013/0113323 A1* | 5/2013 | Yamada | ............... H02K 1/2706 |
| | | | 310/156.07 |
| 2015/0084470 A1* | 3/2015 | Takemoto | ............ H02K 1/2713 |
| | | | 310/156.69 |
| 2015/0222152 A1 | 8/2015 | Yamada et al. | |

FOREIGN PATENT DOCUMENTS

| | | |
|---|---|---|
| JP | S58-127840 U | 8/1983 |
| JP | H3-93451 A | 4/1991 |
| JP | H9-191628 A | 7/1997 |
| JP | H10-56768 A | 2/1998 |
| JP | 2001280247 | 10/2001 |
| JP | 201589321 | 5/2015 |
| JP | 2013226026 | 10/2016 |

OTHER PUBLICATIONS

Written Opinion and International Search Report for International Application No. PCT/JP2016/074094 dated Nov. 8, 2016.

* cited by examiner

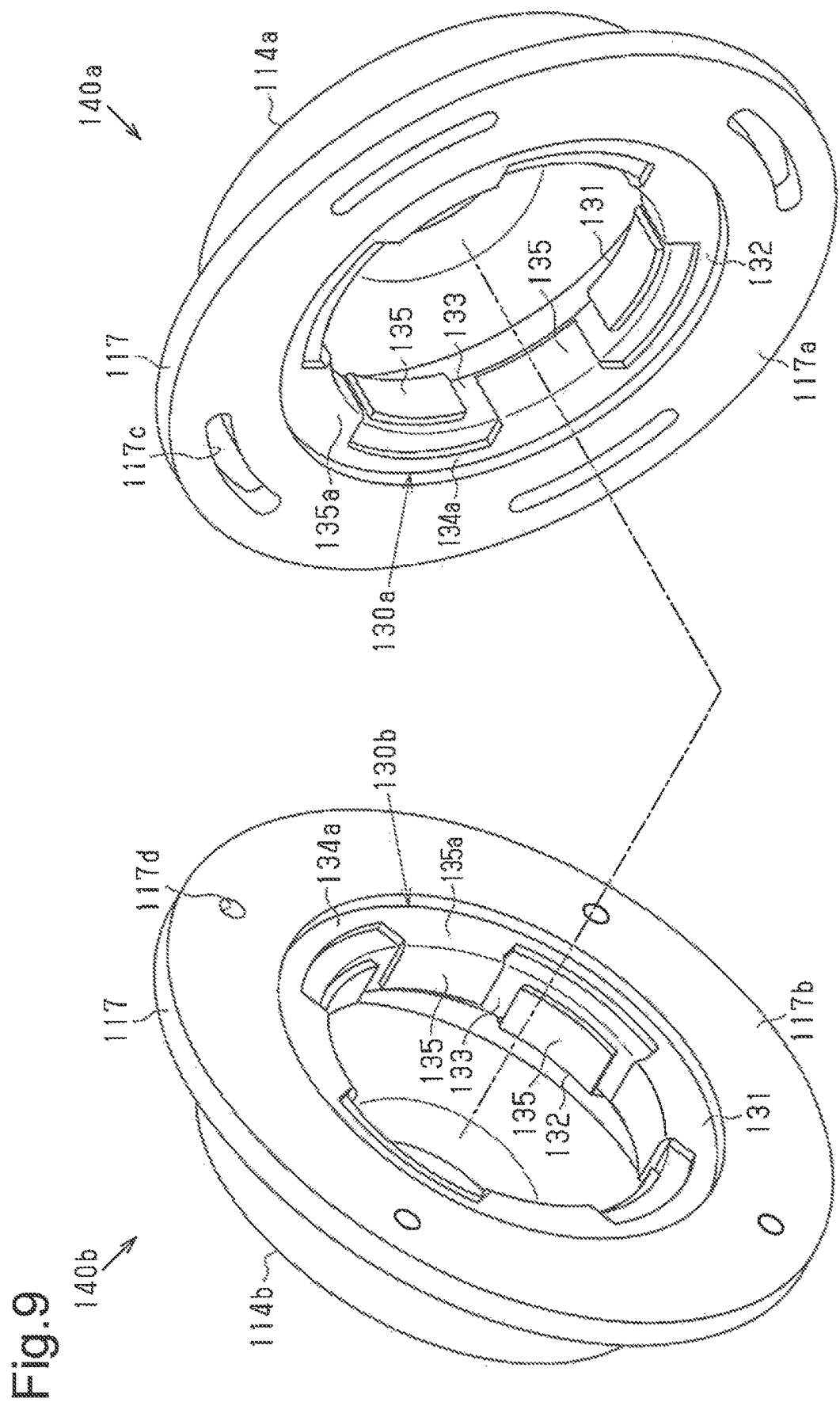

MOTOR, MOTOR CONTROL METHOD AND MOTOR CONTROL DEVICE

RELATED APPLICATIONS

The present application in a National Phase entry of PCT Application No. PCT/JP2016/074094, filed Aug. 18, 2016, which claims priority to Japanese Application No. 2015-163697 filed Aug. 21, 2015, Japanese Application No. 2015-178647 filed Sep. 10, 2015, Japanese Application No. 2015-216019 filed Nov. 2, 2015 and Japanese Application No. 2016-156524 filed Aug. 9, 2016, all of said applications being hereby incorporated by reference in their entirety.

BACKGROUND OF THE INVENTION

The present invention relates to a motor, a method for controlling a motor, and a motor controller.

A known Lundell motor is provided with a Lundell rotor that includes an iron rotor core, which has claw poles arranged in the circumferential direction, and a field magnet, which is arranged in the iron rotor core. The Lundell rotor functions so that the polarity of the claw poles change alternately (for example, patent document 1). In addition to the Lundell rotor, the Lundell motor disclosed in patent document 1 is provided with a Lundell stator that includes an iron stator core, which has claw poles arranged in the circumferential direction, and an annular winding, which is arranged in the iron stator core. The Lundell stator functions so that the polarity of the claw poles change alternately.

The rotor and the stator are both of Lundell types. Such a Lundell motor is referred to as a multi-Lundell motor.

In the motor of patent document 1, the Lundell stator includes a plurality of Lundell stator units arranged in the axial direction inside a motor housing. Each stator unit includes two stator cores.

PRIOR ART DOCUMENTS

Patent Document

Patent Document 1: Japanese Laid-Open Patent Publication No. 2013-226026

SUMMARY OF THE INVENTION

Studies are constantly made to increase the torque and output (torque, rotation speed) of a motor. The inventors of the present invention have also been studying how to increase the torque and output of the multi-Lundell motor described above.

In a motor such as that described above, to reduce magnetic interference between the stator units that are stacked together, it is preferred that an insulator such as a spacer be arranged between the stator units to form a gap between the stator units so that the stator units do not contact each other. However, the insulation member will increase the number of components.

A rotor for a stator such as that described above may include rotor units that are arranged in the axial direction respectively opposing the stator units. The rotor units each include a permanent magnet. Further, a sensor that detects the magnetic flux of the permanent magnet of the rotor may be arranged opposing an axial end of the rotor and detect the rotation angle of the rotor. In this case, the magnetic flux of the stator greatly affects the sensor making it difficult to accurately detect the magnetic flux of the permanent magnet (through a form that is close to a sine wave).

It is a first object of the present invention to provide a motor, a method for controlling a motor, and a motor controller that increases the torque and output.

It is a second object of the present invention to provide a motor that reduces magnetic interference between stator portions while decreasing the number of components.

It is a third object of the present invention to provide a motor that allows the magnetic flux of the permanent magnet of the rotor to be accurately detected.

To achieve the first object, a first aspect of the present invention is a motor including a two-layer rotor, a two-layer stator, and a control unit. The two-layer rotor includes an A-phase rotor and a B-phase rotor that are stacked together. The A-phase rotor includes two rotor cores, each including claw poles arranged at equal angular intervals, and a field magnet, which is located between the two rotor cores. The B-phase rotor includes two rotor cores, each including claw poles arranged at equal angular intervals, and a field magnet, which is located between the two rotor cores. The two-layer stator includes an A-phase stator and a B-phase stator that are stacked together. The A-phase stator includes two stator cores, each including claw poles arranged at equal angular intervals, and an A-phase winding, which is located between the two stator cores. The B-phase stator includes two stator cores, each including claw poles arranged at equal angular intervals, and a B-phase winding, which is located between the two stator cores. The control unit controls an A-phase input voltage that is applied to the A-phase winding and a B-phase input voltage that is applied to the B-phase winding. The A-phase stator and the A-phase rotor are arranged relative to the B-phase stator and the B-phase rotor at an electrical angle of 90 degrees. The control unit advances an angular phase of the A-phase input voltage from its basic voltage waveform and an angular phase of the B-phase input voltage from its basic voltage waveform and sets an excitation width to 180 degrees or less.

To achieve the first object, a second aspect of the present invention provides a method for controlling a motor. The motor includes a two-layer rotor, a two-layer stator, and a control unit. The two-layer rotor includes an A-phase rotor and a B-phase rotor that are stacked together. The A-phase rotor includes two rotor cores, each including claw poles arranged at equal angular intervals, and a field magnet, which is located between the two rotor cores. The B-phase rotor includes two rotor cores, each including claw poles arranged at equal angular intervals, and a field magnet, which is located between the two rotor cores. The two-layer stator includes an A-phase stator and a B-phase stator that are stacked together. The A-phase stator includes two stator cores, each including claw poles arranged at equal angular intervals, and an A-phase winding, which is located between the two stator cores. The B-phase stator includes two stator cores, each including claw poles arranged at equal angular intervals, and a B-phase winding, which is located between the two stator cores. The A-phase stator and the A-phase rotor are arranged relative to the B-phase stator and the B-phase rotor at an electrical angle of 90 degrees. The method comprises applying A-phase input voltage to the A-phase winding, applying B-phase input voltage to the B-phase winding, and setting a phase angle of each of the A-phase input voltage and the B-phase input voltage that is advanced by 24 to 42 degrees from a corresponding basic voltage waveform and setting an excitation width of the A-phase input voltage and the B-phase input voltage to 150 to 170 degrees.

To achieve the first object, a third aspect of the present invention provides a method for controlling a motor. The motor includes a two-layer rotor, a two-layer stator, and a control unit. The two-layer rotor includes an A-phase rotor and a B-phase rotor that are stacked together. The A-phase rotor includes two rotor cores, each including claw poles arranged at equal angular intervals, and a field magnet, which is located between the two rotor cores. The B-phase rotor includes two rotor cores, each including claw poles arranged at equal angular intervals, and a field magnet, which is located between the two rotor cores. The two-layer stator includes an A-phase stator and a B-phase stator that are stacked together. The A-phase stator includes two stator cores, each including claw poles arranged at equal angular intervals, and an A-phase winding, which is located between the two stator cores. The B-phase stator includes two stator cores, each including claw poles arranged at equal angular intervals, and a B-phase winding, which is located between the two stator cores. The A-phase stator and the A-phase rotor are arranged relative to the B-phase stator and the B-phase rotor at an electrical angle of 90 degrees. The method comprises applying A-phase input voltage to the A-phase winding, applying B-phase input voltage to the B-phase winding, and setting a phase angle of each of the A-phase input voltage and the B-phase input voltage that is advanced by 0 to 36 degrees (0 degrees exclusive) from a corresponding basic voltage waveform and setting an excitation width of the A-phase input voltage and the B-phase input voltage to 155 to 180 degrees.

To achieve the first object, a fourth aspect of the present invention provides a method for controlling a motor. The motor includes a two-layer rotor, a two-layer stator, and a control unit. The two-layer rotor includes an A-phase rotor and a B-phase rotor that are stacked together. The A-phase rotor includes two rotor cores, each including claw poles arranged at equal angular intervals, and a field magnet, which is located between the two rotor cores. The B-phase rotor includes two rotor cores, each including claw poles arranged at equal angular intervals, and a field magnet, which is located between the two rotor cores. The two-layer stator includes an A-phase stator and a B-phase stator that are stacked together. The A-phase stator includes two stator cores, each including claw poles arranged at equal angular intervals, and an A-phase winding, which is located between the two stator cores. The B-phase stator includes two stator cores, each including claw poles arranged at equal angular intervals, and a B-phase winding, which is located between the two stator cores. The A-phase stator and the A-phase rotor are arranged relative to the B-phase stator and the B-phase rotor at an electrical angle of 90 degrees. The method includes applying A-phase input voltage to the A-phase winding, applying B-phase input voltage to the B-phase winding, and setting a phase angle of each of the A-phase input voltage and the B-phase input voltage that is advanced by 24 to 36 degrees from a corresponding basic voltage waveform and setting an excitation width of the A-phase input voltage and the B-phase input voltage to 155 to 170 degrees.

To achieve the second object, a fifth aspect of the present invention is a motor including a stator and a housing that accommodates the stator. The stator includes two stator units arranged in an axial direction. The stator units each include two stator cores, each including claw poles arranged in a circumferential direction, and a winding located between the stator cores in the axial direction. The housing includes a first case and a second case that are coupled together. One of the stator units is fixed to the first case. The other one of the stator units is fixed to the second case. In a state in which the first and second cases are coupled together, a clearance exists between the two stator units in the axial direction.

To achieve the third object, a sixth aspect of the present invention is a motor including a stator, a rotor, and a sensor. The stator includes stator units that are arranged in an axial direction. The stator units each include a first stator core, a second stator core, and a winding located between the first stator core and the second stator core. The first stator core and the second stator core each include a claw pole. The claw pole includes a radially-extending portion that extends in a radial direction and a pole portion that extends from a distal end of the radially-extending portion in the axial direction. The rotor includes rotor units that are arranged in the axial direction. The number of the rotor units is the same as the number of the stator units. The rotor units each include a permanent magnet opposing the pole portion. The sensor is located between the permanent magnets in the axial direction. The sensor detects magnetic flux of the permanent magnets.

BRIEF DESCRIPTION OF THE DRAWINGS

FIG. 9 is a perspective view of first and second stator units shown in FIG. 1.

DETAILED DESCRIPTION OF THE PREFERRED EMBODIMENTS

A motor (control method and controller) of a first embodiment will now be described with reference to FIGS. 1 to 6.

Figure 1:
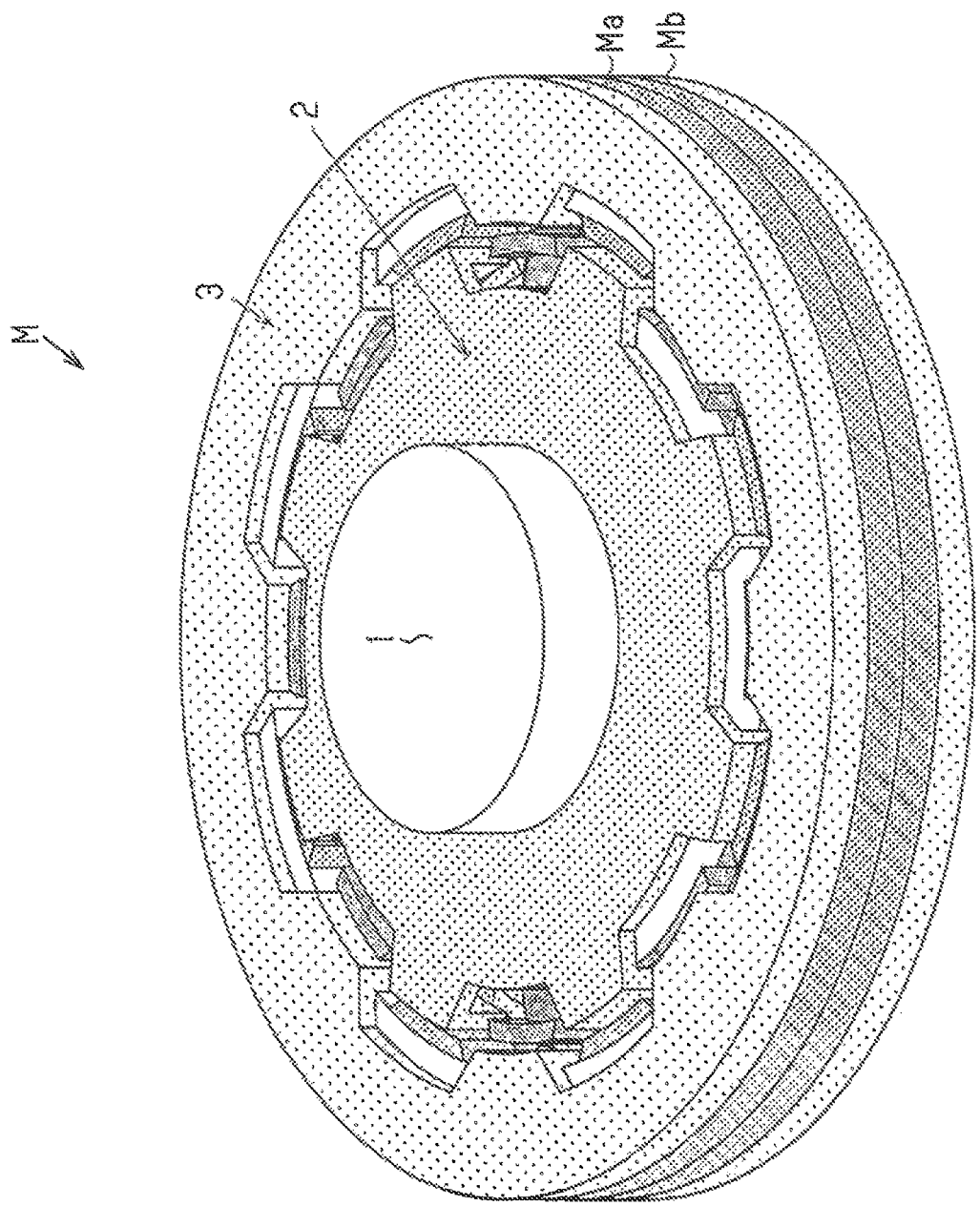
FIG. 1 is a perspective view of a motor according to a first embodiment of the present invention.

FIG. 1 is a perspective view entirely showing a motor M of the present embodiment including a rotation shaft 1 and a rotor 2 fixed to the rotation shaft. A stator 3, which is fixed to a motor housing (not shown), is arranged at the outer side of the rotor 2. The motor M is a two-layer, two-phase Lundell motor in which a multi-Lundell A-phase motor Ma is arranged from above on a multi-Lundell B-phase motor Mb as viewed in FIG. 1. The A-phase motor Ma and the B-phase motor Mb each form a single multi-Lundell motor.

Rotor 2

Figure 2:
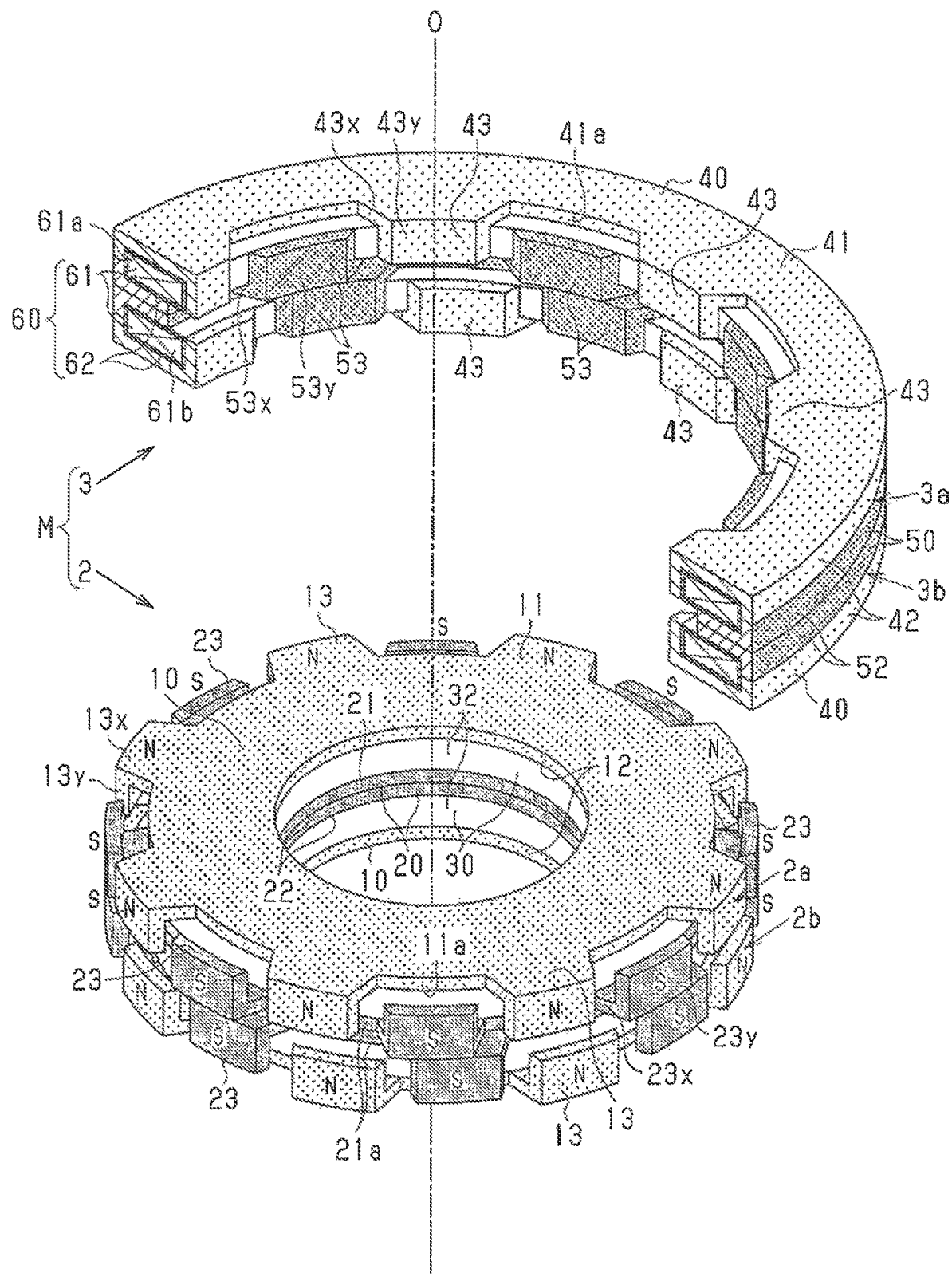
FIG. 2 is an exploded perspective view of the motor of FIG. 1 in which a stator is partially cut.
Figure 3:
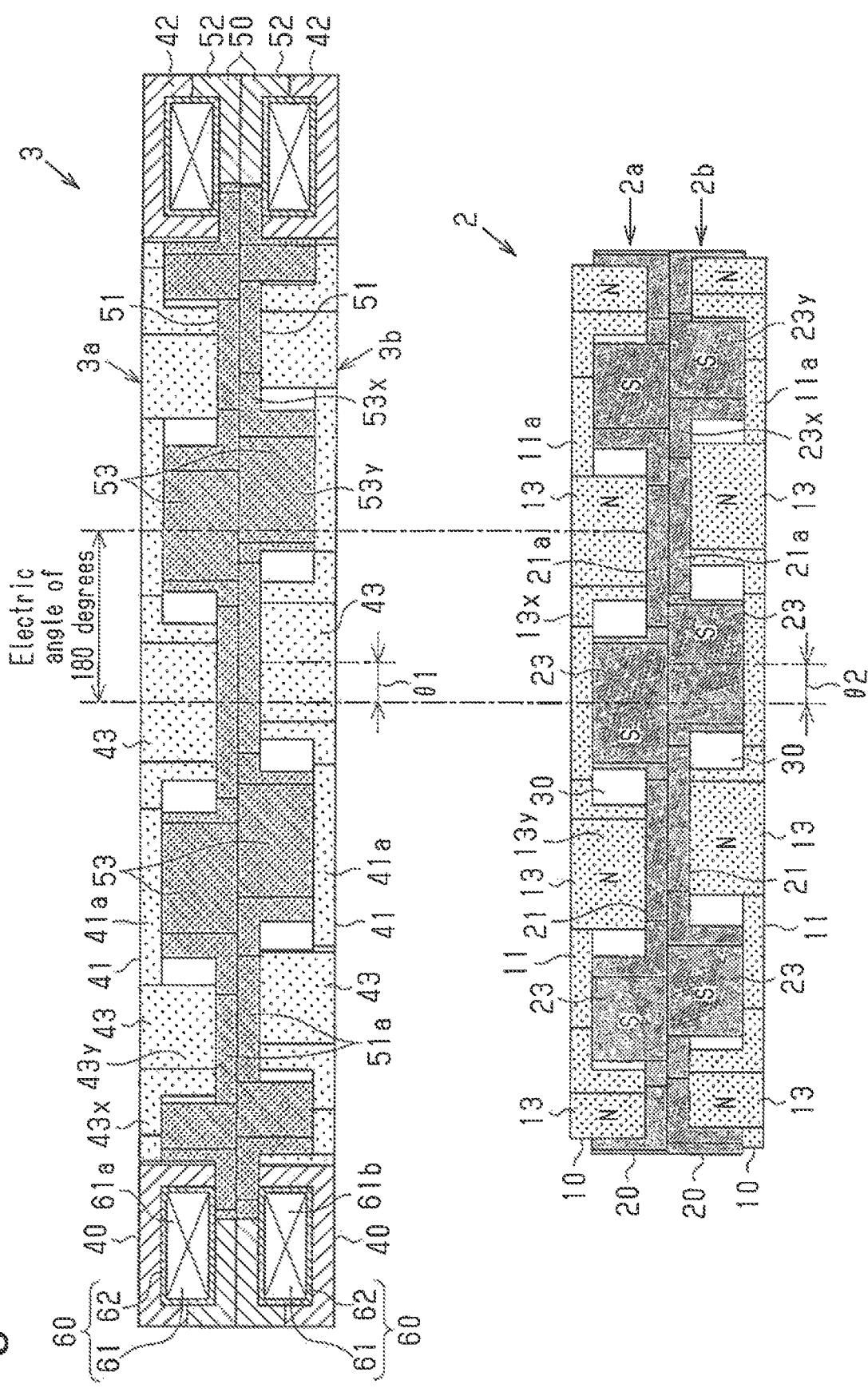
FIG. 3 is an exploded front view of the motor of FIG. 1 taken from the radial direction in which the stator is partially cut.

As shown in FIGS. 2 and 3, the rotor 2 of the motor M has a two-layer, two-phase construction and includes an A-phase rotor unit 2a and a B-phase rotor unit 2b that have Lundell constructions and are stacked together. The A-phase rotor unit 2a and the B-phase rotor unit 2b have the same structure and each include a first rotor core 10, a second rotor core 20, and a field magnet 30.

First Rotor Core 10

The first rotor core 10 includes an annular first rotor core base 11 that is formed from a sheet of magnetic steel. A through hole 12 extends through a central portion of the first rotor core base 11 in order for the first rotor core base 11 to be fitted onto the rotation shaft 1. Further, eight identically shaped first rotor claw pole portions 13 arranged at equal angular intervals project outwardly in the radial direction from an outer circumferential surface 11a of the first rotor core base 11 includes. Each first rotor claw pole portion 13 includes a distal end that is bent in the axial direction toward the second rotor core 20.

In each first rotor claw pole portion 13, the portion projecting radially outward from the outer circumferential surface 11a of the first rotor core base 11 is referred to as a first rotor basal portion 13x and the distal portion bent in the axial direction is referred to as the first rotor pole portion 13y. The first rotor basal portion 13x has a trapezoidal shape as viewed in the axial direction and narrows toward the outer side in the radial direction. The first rotor pole portion 13y has a rectangular shape as viewed in the radial direction. Further, the first rotor pole portion 13y has an arcuate shape as viewed in the axial direction and extends along a circumference about the center axis O of the rotation shaft 1. The circumferential angular range of each first rotor claw pole portion 13 is set to be smaller than the angular range of the gap between adjacent first rotor claw pole portions 13.

Second Rotor Core 20

The second rotor core 20, which is formed from the same material as the first rotor core 10 and shaped identically to the first rotor core 10, includes an annular second rotor core base 21. A through hole 22 extends through a central portion of the second rotor core base 21 in order for the second rotor core base 21 to be fitted onto the rotation shaft 1. Further, eight identically shaped second rotor claw pole portions 23 arranged at equal angular intervals project outwardly in the radial direction from an outer circumferential surface 21a of the second rotor core base 21. Each second rotor claw pole portion 23 includes a distal end that is bent in the axial direction toward the first rotor core 10.

In each second rotor claw pole portion 23, the portion projecting radially outward from the outer circumferential surface 21a of the second rotor core base 21 is referred to as a second rotor basal portion 23x and the distal portion bent in the axial direction is referred to as a second rotor pole portion 23y. The second rotor basal portion 23x has a trapezoidal shape as viewed in the axial direction and narrows toward the outer side in the radial direction. Further, the second rotor pole portion 23y has an arcuate shape as viewed in the axial direction and extends along a circumference about the center axis O of the rotation shaft 1. The circumferential angular range of each second rotor claw pole portion 23 is set to be smaller than the angular range of the gap between adjacent second rotor claw pole portions 23.

The second rotor core 20 and the first rotor core 10 are positioned and fixed together so that the second rotor claw pole portions 23 of the second rotor core 20 are located between the first rotor claw pole portions 13 of the first rotor core 10 as viewed in the axial direction. Here, the second rotor core 20 and the first rotor core 10 are coupled together so that the field magnet 30 is located between the rotor core bases 11 and 21. In the coupled state, the distal end surface of each first rotor claw pole portion 13 is flush with the axially outer surface of the second rotor core base 21 (surface of second rotor core base 21 opposite to surface opposing field magnet 30), and the distal end surface of each second rotor claw pole portion 23 is flush with the axially outer surface of the first rotor core base 11 (surface of first rotor core base 11 opposite to surface opposing field magnet 30).

Field Magnet 30

The field magnet 30 is an annular flat permanent magnet that is a ferrite sintered magnet or the like. A through hole 32 extends through a central portion of the field magnet 30. The rotation shaft 1 extends through the through hole 32. The field magnet 30 is held and fixed between the first and second rotor core bases 11 and 21 so that one side of the field magnet 30 contacts the first rotor core base 11 and the other side of the field magnet 30 contacts the second rotor core base 21. The field magnet 30 has the same outer diameter as the first and second rotor core bases 11 and 21. The field magnet 30 is magnetized in the axial direction so that the first rotor core 10 serves as the N pole and the second rotor core 20 serves as the S pole. Accordingly, the field magnet 30 has the first rotor claw pole portions 13 of the first rotor core 10 function as the N poles and the second rotor claw pole portions 23 of the second rotor core 20 function as the S poles.

In this manner, the A-phase rotor unit 2a and the B-phase rotor unit 2b each include the first and second rotor cores 10 and 20 and the field magnet 30 and are the so-called Lundell rotors. Further, the A-phase rotor unit 2a and the B-phase rotor unit 2b respectively include the first rotor claw pole portions 13, which serve as the N poles, and the second rotor claw pole portions 23, which serve as the S poles, alternately arranged in the circumferential direction and each have sixteen poles (eight pole pairs). The A-phase rotor unit 2a and the B-phase rotor unit 2b are stacked together in the axial direction to form the two-layer, two-phase Lundell rotor 2.

In the stack of the A-phase rotor unit 2a and the B-phase rotor unit 2b, the second rotor core 20 of the A-phase rotor unit 2a is in contact with the second rotor core 20 of the B-phase rotor unit 2b. Further, the second rotor claw pole portions 23 (first rotor claw pole portions 13) of the B-phase rotor unit 2b are shifted by an electrical angle 92 (45 degrees) in the counterclockwise direction from the second rotor claw pole portions 23 (first rotor claw pole portions 13) of the A-phase rotor unit 2a.

Stator 3

As shown in FIGS. 2 and 3, the stator 3, which is located at the radially outer side of the rotor 2, has a two-layer, two-phase construction and includes an A-phase stator unit 3a and a B-phase stator unit 3b that have Lundell constructions and are stacked together. The A-phase stator unit 3a and the B-phase stator unit 3b are stacked together in the axial direction opposing the corresponding A-phase rotor unit 2a and the B-phase rotor unit 2b that are located inward in the radial direction. The A-phase stator unit 3a and the B-phase stator unit 3b have the same structure and each include a first stator core 40, a second stator core 50, and a coil unit 60.

First Stator Core 40

The first stator core 40 includes an annular first stator core base 41 that is formed from a sheet of magnetic steel. The first stator core base 41 includes a radially outer portion defining a first stator cylindrical outer wall 42 that is cylindrical and extends in the axial direction. Further, eight identically shaped first stator claw poles 43 arranged at equal angular intervals project radially inward from an inner circumferential surface 41a of the first stator core base 41. Each first stator claw pole 43 includes a distal end bent in the axial direction toward the second stator core 50.

In each first stator claw pole 43, the portion projecting radially inward from the inner circumferential surface 41a of the first stator core base 41 is referred to as a first stator basal portion 43X and the distal portion bent in the axial direction is referred to as a first stator pole portion 43y. The first stator basal portion 43X has a trapezoidal shape as viewed in the axial direction and narrows toward the inner side in the radial direction. The first stator pole portion 43y has a rectangular shape as viewed in the radial direction. Further, the first stator pole portion 43y has an arcuate shape as viewed in the axial direction and extends along a circumference about the center axis O of the rotation shaft 1. The circumferential angular range of each first stator claw pole 43 is set to be smaller than the angular range of the gap between adjacent first stator claw poles 43.

Second Stator Core 50

The second stator core 50, which is formed from the same material as the first stator core 40 and shaped identically to the first stator core 40, includes an annular second stator core base 51. The second stator core base 51 includes a radially outer portion defining a second stator cylindrical outer wall 52 that is cylindrical and extends in the axial direction. The second stator cylindrical outer wall 52 is in contact with the first stator cylindrical outer wall 42 in the axial direction. Eight identically shaped second stator claw poles 53 arranged at equal angular intervals project radially inward from an inner circumferential surface 51a of the second stator core base 51. Each second stator claw pole 53 includes a distal end that is bent in the distal direction toward the first stator core 40.

In each second stator claw pole 53, the portion projecting radially inward from the inner circumferential surface 51a of the second stator core base 51 is referred to as a second stator basal portion 53x and the distal portion bent in the axial direction is referred to as the second stator pole portion 53y. The second stator basal portion 53x has a trapezoidal shape as viewed in the axial direction and narrows toward the inner side in the radial direction. The second stator pole portion 53y has a rectangular shape as viewed in the radial direction. Further, the second stator pole portion 53y has an arcuate shape as viewed in the axial direction and extends along a circumference about the center axis O of the rotation shaft 1. The circumferential angular range of each second stator claw pole 53 is set to be smaller than the angular range of the gap between adjacent second stator claw poles 53.

The second stator core 50 and the first stator core 40 are arranged and fixed so that the first stator cylindrical outer wall 42 contacts the second stator cylindrical outer wall 52 and so that the second stator claw poles 53 of the second stator core 50 are located between the first stator claw poles 43 of the first stator core 40 as viewed in the axial direction. Here, the inner sides of the first and second stator core bases 41 and 51, the first and second stator cylindrical outer walls 42 and 52, and the first and second stator claw poles 43 and 53 define an annular cavity having a rectangular cross section. The first stator core 40 and the second stator core 50 are coupled together so that the cavity receives the coil unit 60. In the coupled state, the distal end surface of each first stator claw pole 43 is flush with the axially outer surface of the second stator core base 51 (surface of second stator core base 51 opposite to surface opposing coil unit 60), and the distal end surface of each second stator claw pole 53 is flush with the axially outer surface of the first stator core base 41 (surface of first stator core base 41 opposite to surface opposing coil unit 60).

Coil Unit 60

The coil unit 60 includes an annular winding 61 and a coil insulation layer 62, which surrounds the annular winding 61 and is formed by a resin molding. The closed cavity defined by the inner surfaces of the first and second stator core bases 41 and 51, the first and second stator cylindrical outer walls 42 and 52, and the first and second stator claw poles 43 and 53 accommodates the coil unit 60, which is in contact with the inner surfaces.

In this manner, the A-phase stator unit 3a and the B-phase stator unit 3b each include the first and second stator cores 40 and 50 and the coil unit 60 and are the so-called Lundell stators. The annular winding 61 between the first and second stator cores 40 and 50 excites the first and second stator claw poles 43 and 53 to different polarities. The A-phase stator unit 3a and the B-phase stator unit 3b each function as a sixteen-pole stator having the so-called Lundell construction. The A-phase stator unit 3a and the B-phase stator unit 3b are stacked together in the axial direction to form the two-layer, double phase Lundell stator 3.

In the stack of the A-phase stator unit 3a and the B-phase stator unit 3b, the second stator core 50 of the A-phase stator unit 3a is in contact with the second stator core 50 of the B-phase stator unit 3b. Further, the first stator claw poles 43 (second stator claw poles 53) of the B-phase stator unit 3b are shifted by an electrical angle θ1 (45 degrees) in the clockwise direction from the first stator claw poles 43 (second stator claw poles 53) of the A-phase stator unit 3a.

Thus, the A-phase and B-phase stator units 3a and 3b are shifted by 45 degrees in the stator 3 in a direction reverse to the direction in which the A-phase and B-phase rotor units 2a and 2b are shifted by 45 degrees in the rotor 2. The A-phase and B-phase stator units 3a and 3b of the stator 3 are shifted from the A-phase and B-phase rotor units 2a and 2b of the rotor 2 by an electrical angle of 90 degrees (electrical angle θ1+|θ2|). More specifically, the A-phase stator unit 3a and the A-phase rotor unit 2a are arranged relative to the B-phase stator unit 3b and the B-phase rotor unit 2b at an electrical angle set to 90 degrees. Further, an A-phase input voltage va of two-phase AC power is applied to the coil unit 60 (annular winding 61) of the A-phase stator unit 3a, and a B-phase input voltage vb of the two-phase AC power is applied to the coil unit 60 (annular winding 61) of the B-phase stator unit 3b.

The control for driving the two-layer, two-phase Lundell motor M will now be described with reference to FIG. 4.

Figure 4:
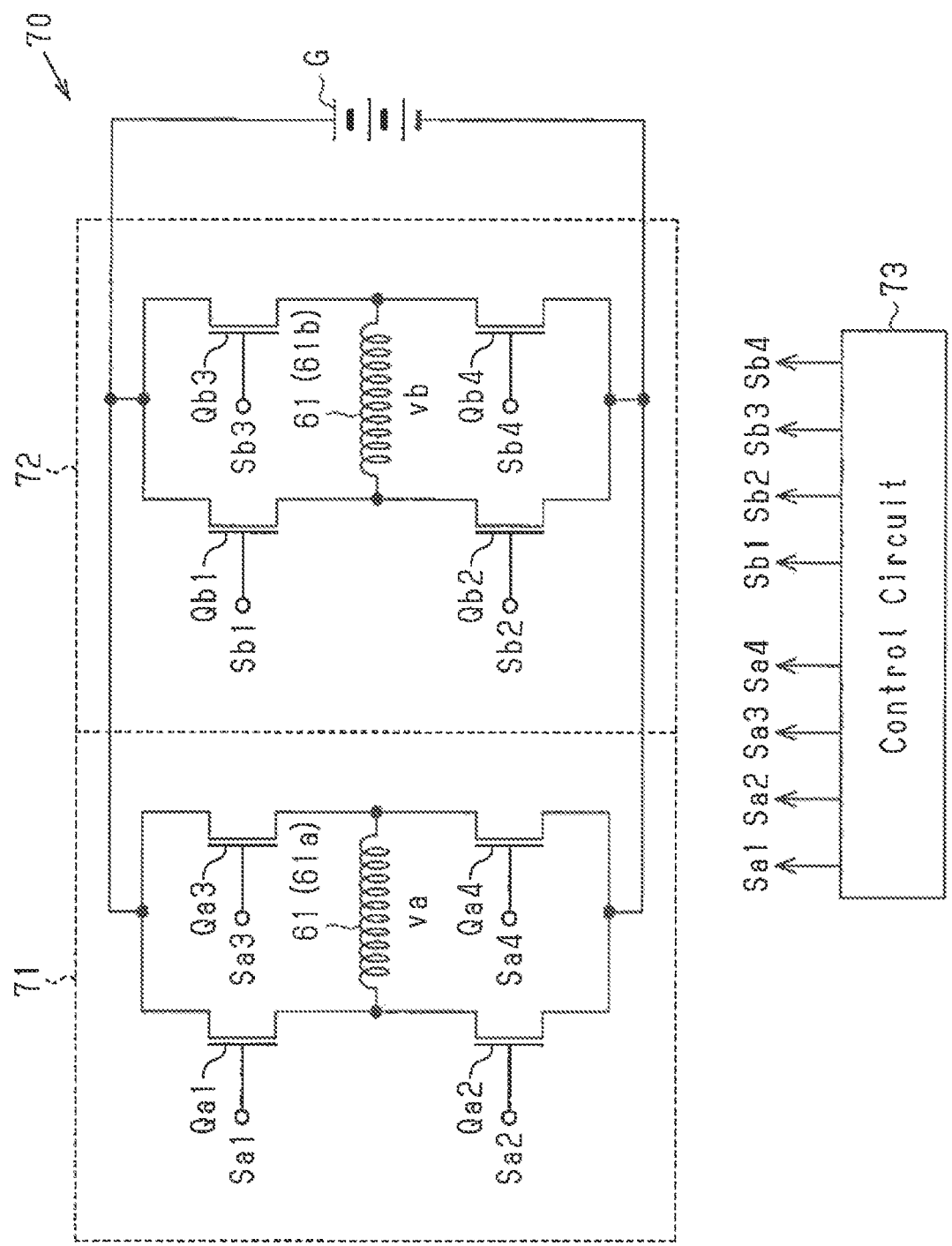
FIG. 4 is a diagram of a drive control circuit for the motor of FIG. 1.

As shown in FIG. 4, a drive control circuit 70 serving as a control unit includes an A-phase drive circuit section 71, a B-phase drive circuit section 72, and a control circuit 73 that drives and controls the two drive circuit sections 71 and 72.

A-Phase Drive Circuit Section 71

The A-phase drive circuit section 71 is formed by a full bridge circuit including four MOS transistors Qa1, Qa2, Qa3, and Qa4. The four MOS transistors Qa1 to Qa4 are separated into the set of the MOS transistors Qa1 and Qa4, which are connected in a bridged manner, and the set of the MOS transistors Qa2 and Qa3, which are connected in a bridged manner, at opposite sides of the annular winding 61 (hereafter, referred to as the A-phase annular winding 61a) of the A-phase stator unit 3a. The two sets of the MOS transistors Qa1 and Qa4 and the MOS transistors Qa2 and Qa3 are alternately activated and deactivated to generate the A-phase input voltage va that is applied to the A-phase annular winding 61a. The A-phase input voltage va is generated from, for example, a DC power G of, for example, twelve volts that is supplied to the A-phase drive circuit section 71.

B-Phase Drive Circuit Section 72

The B-phase drive circuit section 72 is also formed by a full bridge circuit including four MOS transistors Qb1, Qb2, Qb3, and Qb4. The four MOS transistors Qb1 to Qb4 are separated into the set of the MOS transistors Qb1 and Qb4, which are connected in a bridged manner, and the set of the MOS transistors Qb2 and Qb3, which are connected in a bridged manner, at opposite sides of the annular winding 61 (hereafter, referred to as the B-phase annular winding 61b) of the A-phase stator unit 3a. The two sets of the MOS transistors Qb1 and Qb4 and the MOS transistors Qb2 and Qb3 are alternately activated and deactivated to generate the B-phase input voltage vb that is applied to the B-phase annular winding 61b. The B-phase input voltage vb is generated from the DC power G.

Control Circuit 73

The control circuit 73 generates drive signals Sa1 to Sa4 that are respectively sent to the gate terminals of the MOS transistors Qa1 to Qa4 in the A-phase drive circuit section 71. More specifically, the control circuit 73 alternately activates and deactivates the set of the MOS transistors Qa1 and Qa4 and the set of the MOS transistors Qa2 and Qa3 to generate the drive signals Sa1 to Sa4 that control the excitation of the A-phase annular winding 61a.

Further, the control circuit 73 generates drive signals Sb1 to Sb4 that are respectively sent to the gate terminals of the MOS transistors Qb1 to Qb4 in the B-phase drive circuit section 72. More specifically, the control circuit 73 alternately activates and deactivates the set of the MOS transistors Qb1 and Qb4 and the set of the MOS transistors Qb2 and Qb3 to generate the drive signals Sb1 to Sb4 that control the excitation of the B-phase annular winding 61b.

Figure 5A:
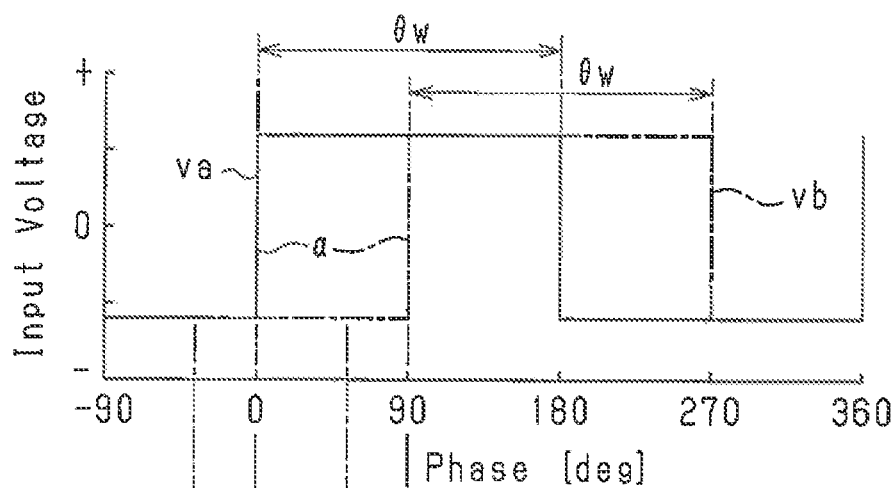
FIG. 5A is a basic voltage waveform diagram of the input voltage.

FIG. 5A shows basic voltage waveforms α of the A-phase and B-phase input voltages va and vb applied to the A-phase and B-phase annular windings 61a and 61b. The phase difference between the A-phase and B-phase input voltages va and vb is set to 90 degrees in the present embodiment. Further, an excitation width θw of 180 degrees is set for each of the positive and negative polarities of the basic voltage waveforms α of the A-phase and B-phase input voltages va and vb. The inventors of the present invention have studied how the torque and output (torque, rotation speed) of the motor M changes when the phases of the A-phase and B-phase input voltages va and vb are advanced from the basic voltage waveform α (set phase angle θd) thereby decreasing the excitation width θw from 180 degrees.

Figure 5B:
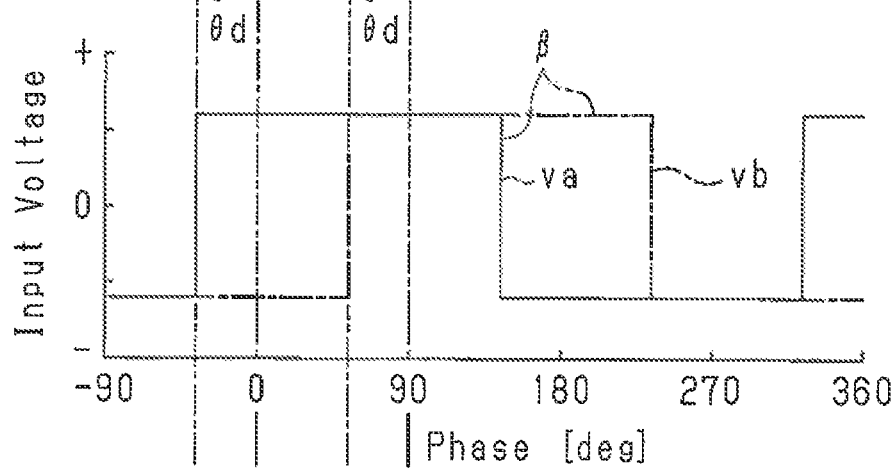
FIG. 5B is a waveform diagram in which the phase angle of FIG. 5A is shifted.
Figure 5C:
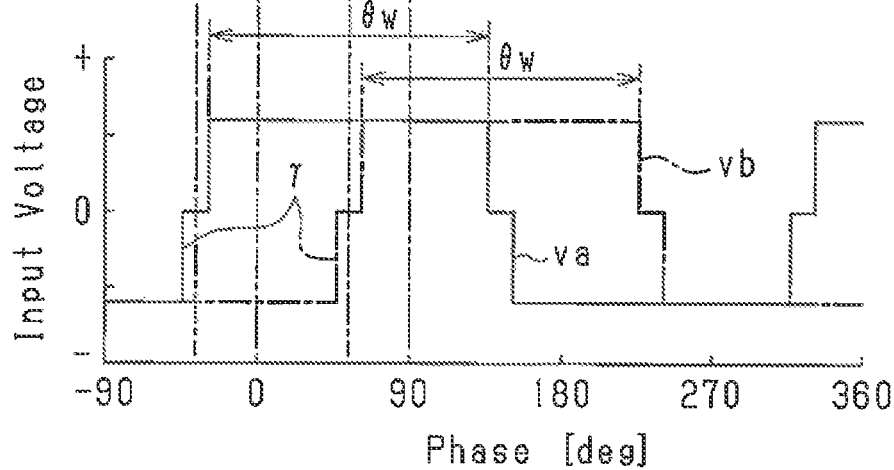
FIG. 5C is a waveform diagram in which the phase angle and the excitation width are shifted.

FIG. 5B shows first voltage waveforms β obtained when advancing the basic voltage waveforms α of the A-phase and B-phase input voltages va and vb by phase angle θd. FIG. 5C shows second voltage waveforms γ obtained when advancing the basic voltage waveforms α of the A-phase and B-phase input voltages va and vb by the phase angle θd and consequently decreasing the excitation width θw from 180 degrees. The excitation width θw is changed to have a symmetric shape with respect to its central position so that a rising edge and a trailing edge appear in the same manner at the central position.

Figure 6A:
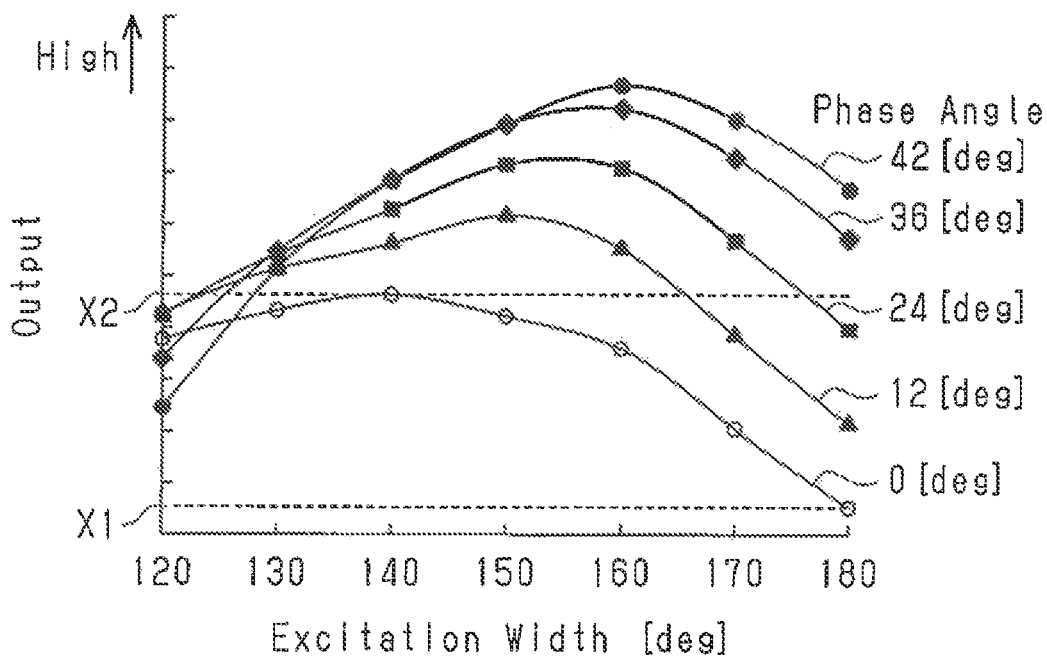
FIG. 6A is a graph showing the output with respect to the excitation width for each phase angle.
Figure 6B:
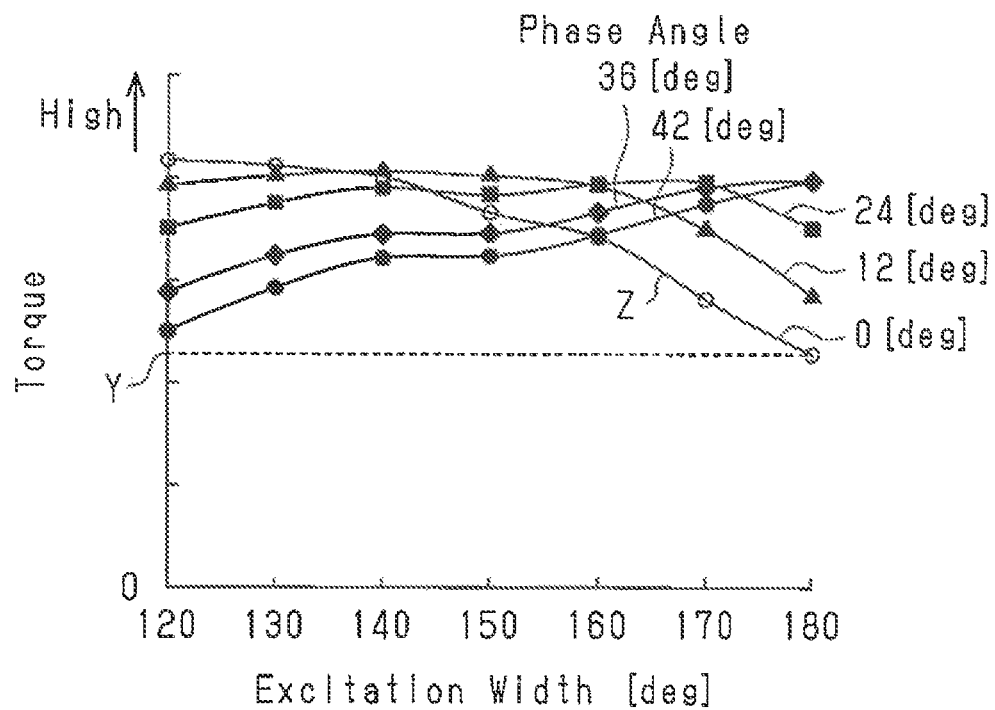
FIG. 6B is a graph showing the torque with respect to the excitation width for each phase angle.

FIGS. 6A and 6B show changes in the phase angle θd and the excitation width θw and the output and torque of the motor M with respect to the basic voltage waveforms α of the A-phase and B-phase input voltages va and vb.

More specifically, FIG. 6A is a graph plotting changes in the output of the motor M (torque, rotation speed) for the phase angles θd of 0 degrees (basic voltage waveform α), 12 degrees, 24 degrees, 36 degrees, and 42 degrees when the excitation width θw is changed by 10 degrees at a time within the range of 120 degrees to 180 degrees.

As illustrated in FIG. 6A, when the phase angle θd is greater than 0 degrees and the excitation width θw is less than or equal to 180 degrees, the output value is greater than that when the phase angle θd is 0 degrees and the excitation width θw is 180 degrees, that is, greater than a first reference value X1, which is the output value of the basic voltage waveform α.

Further, if the phase angle θd is 0 degrees, the output value of the motor M is maximal when the excitation width θw is approximately 140 degrees. The output value in this state is referred to as a second reference value X2. The phase angle θd that exceeds the second reference value X2 is 12 degrees when the excitation width θw is within the range of 125 degrees to 165 degrees. The maximum output value is obtained at the excitation width θw of approximately 150.5 degrees. When the phase angle θd is 24 degrees, the output exceeds the second reference value X2 at the excitation width θw from 125 degrees to 175 degrees, and the maximum output value is obtained at the excitation width θw of approximately 155±5 degrees. When the phase angle θd is 36 degrees, the output exceeds the second reference value X2 at the excitation width θw from 125 degrees to 180 degrees, and the maximum output value is obtained at the excitation width θw of approximately 160±5 degrees. When the phase angle θd is 42 degrees, the output exceeds the second reference value X2 at the excitation width θw from 130 degrees to 180 degrees, and the maximum output value is obtained at the excitation width θw of approximately 160±5 degrees. The maximum output value of the motor M is large at least when the phase angle θd is within the range of 0 degrees to 42 degrees.

Accordingly, the output of the motor M may be increased by setting the phase angle θd and the excitation width θw of the A-phase and B-phase input voltages va and vb so that the phase angle θd is advanced by more than 0 degrees from the basic voltage waveform α and the excitation width θw is less than or equal to 180 degrees. Further, an increase in the output of the motor M may further be ensured by advancing the phase angle θd from the basic voltage waveform α by 24 degrees to 42 degrees and setting the excitation width θw to 150 degrees to 170 degrees.

FIG. 6B is a graph plotting changes in the torque of the motor M for the phase angles θd of 0 degrees (basic voltage waveform α), 12 degrees, 24 degrees, 36 degrees, and 42 degrees when the excitation width θw is changed by 10 degrees at a time within the range of 120 degrees to 180 degrees.

As illustrated in FIG. 6B, when the phase angle θd is greater than 0 degrees and the excitation width θw is less than or equal to 180 degrees, the torque is greater than that when the phase angle θd is 0 degrees and the excitation width θw is 180 degrees, that is, greater than a reference value Y, which is the torque of the basic voltage waveform α.

When the phase angle θd is zero degrees, the torque of the motor M gradually increases as the excitation width θw decreases from 180 degrees to 120 degrees. In other words, when the phase angle θd is 0 degrees, the torque of the motor M gradually decreases as the excitation width θw increases from 120 degrees to 180 degrees. When the changes in the torque plotted for the phase angle θd of 0 degrees is referred to as the reference curve Z, the phase angle θd that exceeds the reference curve Z is 12 degrees when the excitation width θw is within the range of 135 degrees to 180 degrees. When the phase angle θd is 24 degrees, the torque exceeds the reference curve Z at the excitation width θw of 145 degrees to 180 degrees. When the phase angle θd is 36 degrees, the torque exceeds the reference curve Z at the excitation width θw of 155 degrees to 180 degrees. When the phase angle θd is 42 degrees, the torque exceeds the reference curve Z at the excitation width θw of 160 degrees to 180 degrees.

When the phase angle θd is set to 12 degrees, 24 degrees, 36 degrees, or 42 degrees and not 0 degrees, it is further ensured that the torque exceeds the reference curve Z when the excitation width θw is 160 degrees to 180 degrees. Further, the torque when the phase angle θd is 42 degrees is entirely lower than the torque when the phase angle θd is 36 degrees. Thus, when setting the phase angle θd without including 42 degrees, it is further ensured that the torque exceeds the reference curve Z when the excitation width θw is 155 degrees to 180 degrees.

Accordingly, the torque of the motor M may be increased by setting the phase angle θd and the excitation width θw of the A-phase and B-phase input voltages va and vb so that the phase angle θd is advanced by more than 0 degrees from the basic voltage waveform α and the excitation width θw is less than or equal to 180 degrees. Further, an increase in the torque of the motor M may be further ensured by advancing the phase angle θd from the basic voltage waveform α by 0 degrees to 42 degrees (0 degrees exclusive) and setting the excitation width θw to 160 degrees to 180 degrees. Additionally, an increase in the torque of the motor M is still further ensured by setting the phase angle θd, excluding 42 degrees, to 0 to 36 degrees (0 degrees exclusive) and setting the excitation width θw to 155 degrees to 180 degrees.

To obtain high output and high torque while taking into account the characteristics illustrated in FIGS. 6A and 6B, it is preferred that the phase angle θd be set to 24 degrees to 36 degrees and the excitation width θw be set to 155 degrees to 170 degrees.

When the phase angle θd is set to 0 degrees and the excitation width θw is set to 180 degrees (basic voltage waveform α), the falling of current is retarded from the induced voltage generated at the coil unit 60 of the motor M. This produces a period during which the sign of the induced voltage is reverse to the sign of the current and thereby generates minus torque (negative torque). When the excitation width θw is set to 155 degrees to 170 degrees, a non-excitation section is produced during the period in which the polarities of the first and second stator claw poles 43 and 53 are switched. The falling of current ends during this period. This shortens the period during which the sign of the induced voltage is reverse to the sign of the current and limits the generation of minus torque. Further, the setting of the excitation width θw to 155 degrees to 170 degrees allows for excitation in only the range in which a magnetic attraction force is effective between the rotor 2 and the stator 3. Further, when advancing the phase angle θd by 24 to 36 degrees, the rising of current is advanced, and the falling of current is retarded. This limits the generation of minus torque.

In this manner, the generation of minus torque is limited and the output and torque of the motor M is increased by setting the excitation width θw and the phase angle θd to suitable values. In the present embodiment, the A-phase and B-phase input voltages va and vb of the phase angle θd and the excitation width θw are generated in the above-described range to drive the motor M.

The first embodiment has the advantages described below.

(1) The A-phase and B-phase input voltages va and vb are applied to the A-phase and B-phase annular windings 61a and 61b. The phase angle θd is advanced by more than 0 degrees from the basic voltage waveform α of each of the A-phase and B-phase input voltages va and vb, and the excitation width θw is set to 180 degrees or less (refer to FIGS. 6A and 6B). This increases the output and torque of the motor M.

(2) The A-phase and B-phase input voltages va and vb are applied to the A-phase and B-phase annular windings 61a and 61b. The phase angle θd is advanced by 24 degrees to 42 degrees from the basic voltage waveform α of the A-phase and B-phase input voltages va and vb, and the excitation width θw is set to 150 degrees to 170 degrees (refer to FIG. 6A). This further ensures that the output of the motor M is increased.

(3) When the phase angle θd is advanced by 0 degrees to 36 degrees (0 degrees exclusive) from the basic voltage waveform α of each of the A-phase and B-phase input voltages va and vb, the excitation width θw is set to 155 degrees to 180 degrees (refer to FIG. 6B). This further ensures that the torque of the motor M increases.

(4) When the phase angle θd is advanced by 24 degrees to 36 degrees from the basic voltage waveform α of each of the A-phase and B-phase input voltages va and vb, the excitation width θw is set to 155 degrees to 170 degrees (refer to FIGS. 6A and 6B). This increases the output and the torque of the motor M.

The first embodiment may be modified as described below.

The setting and combination of the advanced phase angle θd and the excitation width θw of the A-phase and B-phase input voltages va and vb may be changed within a range that increases the output and torque of the motor M.

The structure of the rotor 2 and the stator 3 of the motor M are examples and may be changed.

In the first embodiment, the stator cores 40 and 50 and the rotor cores 10 and 20 are formed by sheets of magnetic steel but may instead be formed by a magnetic powder core molded through compression molding. For example, a mixture of magnetic powder, such as iron powder, and an insulator, such as a resin, undergoes thermal press molding in a mold to form the stator cores 40 and 50 and the rotor cores 10 and 20. This increases the freedom of design of the stator cores 40 and 50 and the rotor cores 10 and 20 and makes the manufacturing process very simple. Further, adjustment of the mixed amount of the magnetic powder and the insulator allows for easy adjustment of the reduced amount of eddy current.

A second embodiment of the present invention will now be described.

Figure 7:
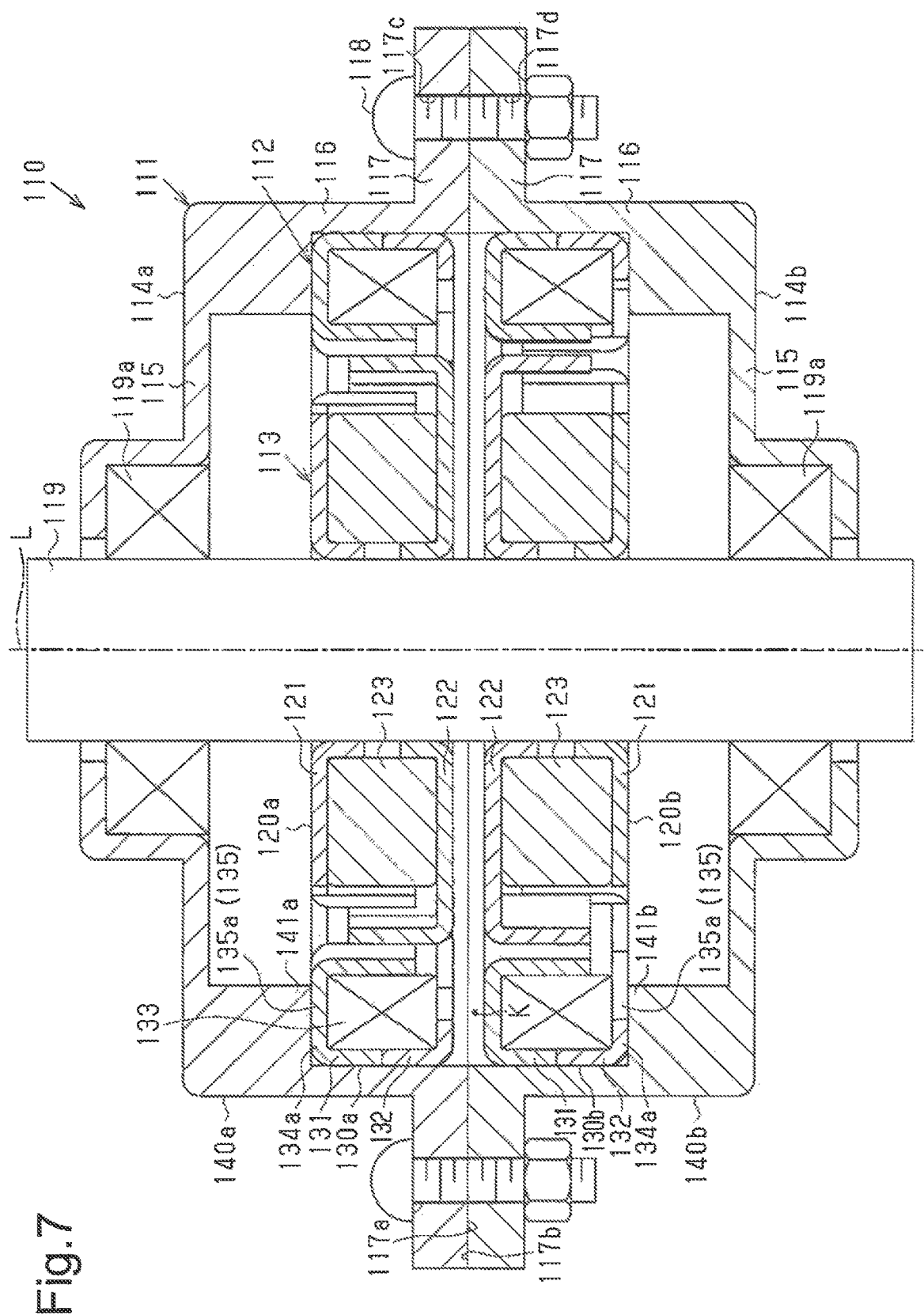
FIG. 7 is a cross-sectional view of a motor according to a second embodiment of the present invention.

As shown in FIG. 7, in the present embodiment, a motor 110, which is a brushless motor, includes a housing 111, a stator 112, and a rotor 113. The stator 112 and the rotor 113 are accommodated in the housing 111.

The housing 111 includes two U-shaped cases 114a and 114b (first case and second case). The cases 114a and 114b, which are generally identical in shape, each include a disk-shaped bottom wall 115, a tubular side wall 116 extending from the outer circumferential edge of the bottom wall 115, and a flange 117 extending outwardly in the radial direction from the end (open end) of the side wall 116 located at the opposite side of the bottom wall 115. The flange 117 is flat and extends orthogonal to the axial direction of the motor 110. The bottom wall 115 and the side wall forms a case body of the corresponding one of the cases 114a and 114b. The flanges 117 of the cases 114a and 114b are held in contact with each other in the axial direction and fastened together by screws 118 to form the housing 111. A rotation shaft 119 that extends through the rotor 113 is supported by a bearing 119a located in the central portion of the bottom wall 115 of each of the cases 114a and 114b.

Structure of Rotor

The rotor 113 includes the rotation shaft 119, an A-phase rotor unit 120a, and a B-phase rotor unit 120b. The A-phase rotor unit 120a and the B-phase rotor unit 120b are rotated integrally with the rotation shaft 119 and arranged next to each other in the axial direction. Further, the A-phase rotor unit 120a and the B-phase rotor unit 120b both have a Lundell construction and are identical in shape. The A-phase rotor unit 120a and the B-phase rotor unit 120b are each annular and extend about the axis L of the rotation shaft 119.

Figure 8:
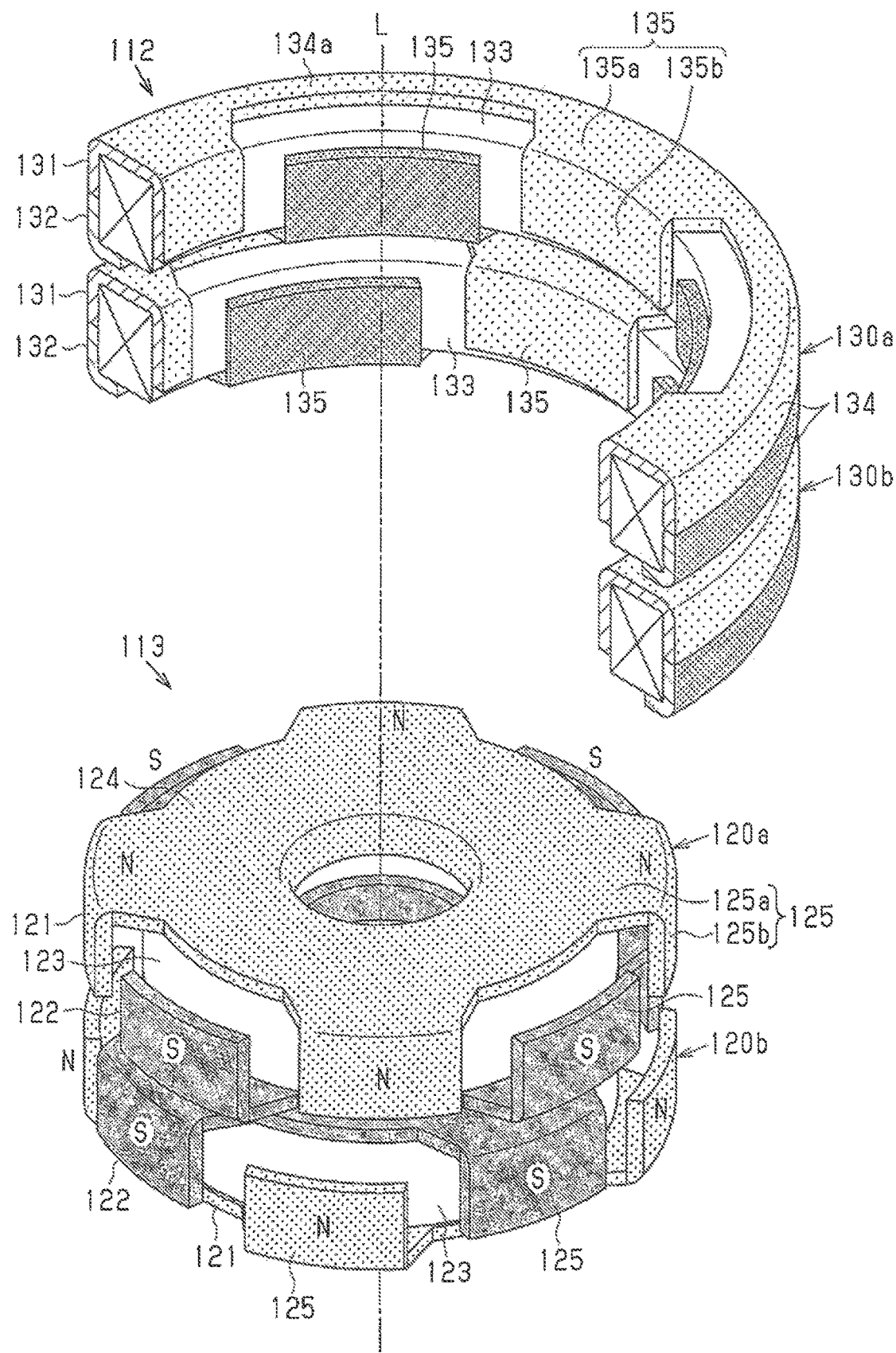
FIG. 8 is a perspective view of a rotor and stator that is partially cut.

As shown in FIG. 8, the A-phase rotor unit 120a and the B-phase rotor unit 120b each include two identically shaped rotor cores (first rotor core 121 and second rotor core 122) and a field magnet 123 located between the two rotor cores 121 and 122.

The rotor cores 121 and 122 each include an annular core base 124 and a plurality of (four in present embodiment) claw poles 125 extending outwardly in the radial direction from the outer circumferential edge of the core base 124. The claw poles 125, which are identical in shape, each include a radially-extending portion 125a and a pole portion 125b. The radially-extending portion 125a extends outwardly in the radial direction from the outer circumferential edge of the core base 124. The pole portion 125b extends in the axial direction from the distal end (radially outer end) of the radially-extending portion 125a. The claw poles 125 are arranged at equal intervals (90-degree intervals) in the circumferential direction.

The first and second rotor cores 121 and 122 are coupled together so that the claw poles 125 (pole portions 125b) of the first rotor core 121 extend in a direction opposite to the claw poles 125 of the second rotor core 122. In the coupled state, the pole portions 125b of the first rotor core 121 and the pole portions 125b of the second rotor core 122 are alternately arranged in the circumferential direction at equal intervals.

Further, in the coupled state, the field magnet 123 is located between the first and second rotor cores 121 and 122 in the axial direction. The field magnet 123 is a disk-shaped permanent magnet such as a ferrite sintered magnet. The field magnet 123 is located between the two core bases 124 of the first and second rotor cores 121 and 122 in the axial direction. The field magnet 123 is magnetized in the axial direction so that the first rotor core 121 serves as the N-pole and the second rotor core 122 serves as the S-pole. Accordingly, as shown in FIG. 8, the field magnet 123 causes the claw poles 125 of the first rotor core 121 to function as N-poles and the claw poles 125 of the second rotor core 122 to function as S-poles.

Each of the A-phase rotor unit 120a and the B-phase rotor unit 120b includes the first and second rotor cores 121 and 122 and the field magnet 123 and form the so-called Lundell construction that uses the field magnet 123. Further, the A-phase rotor unit 120a and the B-phase rotor unit 120b form eight poles (four pole pairs) in which the claw poles 125 of the first rotor core 121 serving as N-poles and the claw poles 125 of the second rotor core 122 serving as S-poles are alternately arranged in the circumferential direction.

The A-phase rotor unit 120a and the B-phase rotor unit 120b formed as described above are arranged next to one another in the axial direction and form the rotor 113 having a two-phase Lundell construction.

The angle at which the B-phase rotor unit 120b is positioned relative to the A-phase rotor unit 120a is shifted by a predetermined angle in the clockwise direction as viewed from the A-phase side in the axial direction. More specifically, the claw poles 125 of the B-phase rotor unit 120b are shifted by the predetermined angle in the clockwise direction from the claw poles 125 of the A-phase rotor unit 120a. The angle by which the B-phase rotor unit 120b is shifted in the clockwise direction is set to, for example, an electrical angle of 45 degrees (mechanical angle of 11.25 degrees).

Structure of Stator

As shown in FIG. 7, the stator 112 includes an A-phase stator portion 130a and a B-phase stator portion 130b that are arranged next to each other in the axial direction in the housing 111. The A-phase stator portion 130a and the B-phase stator portion 130b are both Lundell constructions and identical in structure and shape. The A-phase stator portion 130a and the B-phase stator portion 130b are each annular and extend about the axis L of the rotation shaft 119. The A-phase stator portion 130a and the B-phase stator portion 130b are located at the outer side of the A-phase rotor unit 120a and the B-phase rotor unit 120b, respectively.

As shown in FIG. 8, the A-phase stator portion 130a and the B-phase stator portion 130b each include two identically shaped stator cores (first stator core 131 and second stator core 132) and a winding 133 located between the stator cores 131 and 132.

The stator cores 131 and 132 each include a tubular outer circumferential wall 134 that extends about the axis L. An inwardly-extending portion 134a is bent at a right angle to extend inwardly in the radial direction from one axial end of the outer circumferential wall 134. The inwardly-extending portion 134a extends along the outer circumferential wall 134.

The stator cores 131 and 132 each include a plurality of (four in present embodiment) claw poles 135 extending inwardly in the radial direction from the inwardly-extending portion 134a. The claw poles 135, which are identical in shape, each include a radially-extending portion 135a, which extend inwardly in the radial direction from the inner circumferential edge of the inwardly-extending portion 134a, and a pole portion 135b, which extends in the axial direction from the distal end (radially outer end) of the radially-extending portion 135a. The claw poles 135 are arranged at equal intervals (90-degree intervals) in the circumferential direction.

The first and second stator cores 131 and 132 are coupled together so that the claw poles 135 (pole portions 135b) of the first stator core 131 extend in a direction opposite to the claw poles 135 of the second stator core 132. In the coupled state, the pole portions 135b of the first stator core 131 and the pole portions 135b of the second rotor core 122 are arranged at equal intervals in the circumferential direction.

Further, in the coupled state, a winding 133 is located between the first and second stator cores 131 and 132 in the axial direction. The winding 133 is annular and extends in the circumferential direction of the stator 112. Further, the winding 133 is located between the radially-extending portions 135a of the first and second stator cores 131 and 132 in the axial direction and located between the outer circumferential wall 134 and the pole portions 135b of the first and second stator cores 131 and 132 in the radial direction. The winding 133, when supplied with power, excites the claw poles 135 of the first stator core 131 and the claw poles 135 of the second stator core 132 so that the polarity of the claw poles 135 of the first stator core 131 differs from the polarity of the claw poles 135 of the second stator core 132.

For the sake of brevity, terminals extending from the winding 133 are not shown in the drawings. Accordingly, the drawings do not shown slits or grooves formed in the outer circumferential wall 134 of the first and second stator cores 131 and 132 or the housing 111 to draw out the terminals.

The A-phase stator portion 130a and the B-phase stator portion 130b that include the first and second stator cores 131 and 132 and the windings 133 form the so-called Lundell construction. More specifically, when excited by corresponding winding 133, the A-phase stator portion 130a and the B-phase stator portion 130b each form an eight-pole Lundell construction in which the polarity of the claw poles 135 of the first stator core 131 differs from the polarity of the claw poles 135 of the second stator core 132.

The A-phase stator portion 130a and the B-phase stator portion 130b form the stator 112 having a two-phase Lundell construction in which the second stator core 132 of the A-phase stator portion 130a and the first stator core 131 of the B-phase stator portion 130b are arranged opposing each other in the axial direction with a clearance in between.

The angle at which the B-phase stator portion 130b is arranged relative to the A-phase stator portion 130a is shifted by a predetermined angle in the counterclockwise direction as viewed from the A-phase side in the axial direction. More specifically, the claw poles 135 of the B-phase stator portion 130b are shifted by the predetermined angle in the counterclockwise direction from the claw poles 135 of the A-phase stator portion 130a. The angle by which the B-phase stator portion 130b is shifted in the counterclockwise direction is set to, for example, an electrical angle of 45 degrees (mechanical angle of 11.25 degrees).

The relationship of the stator 112, which includes the A-phase stator portion 130a and the B-phase stator portion 130b, and the housing 111 will now be described.

As shown in FIGS. 7 and 9, the A-phase stator portion 130a is fixed to one case 114a of the housing 111. The first stator portion 130a and the case 114a define a first stator unit 140a. In the same manner, the B-phase stator portion 130b is fixed to another case 114b of the housing 111. The stator portion 130b and the case 114b define a second stator unit 140b. In the description hereafter, the case 114a to which the A-phase stator portion 130a is fixed is referred to as the A-phase case 114a. Further, the case 114b, to which the B-phase stator portion 130b is fixed, is referred to as the B-phase case 114b.

As shown in FIG. 7, the A-phase case 114a of the first stator unit 140a includes an abutment portion 141a extending toward the inner side from the side wall 116 of the case 114a. The abutment portion 141a is axially abut against the inwardly-extending portion 134a and the radially-extending portions 135a (claw poles 135) of the first stator core 131 in the A-phase stator portion 130a. This positions the A-phase stator portion 130a relative to the A-phase case 114a in the axial direction.

The A-phase stator portion 130a, which is positioned in the axial direction as described above, is located toward the inner side of the case (toward bottom wall 115 of A-phase case 114a) from an axial end surface 117a of the flange 117, which is the surface of the A-phase case 114a abutting the B-phase case 114b. More specifically, the axial end surface of the A-phase stator portion 130a that is closer to the B-phase stator portion 130b, namely, the inwardly-extending portion 134a and the radially-extending portions 135a (claw poles 135) of the second stator core 132 is located toward the inner side of the case from the axial end surface 117a of the flange 117 of the A-phase case 114a (refer to FIG. 9).

In the same manner, the B-phase case 114b of the second stator unit 140b includes an abutment portion 141b extending toward the inner side from the side wall 116 of the case 114b. The abutment portion 141b is axially abut against the inwardly-extending portion 134a and the radially-extending portion 135a (claw poles 135) of the second stator core 132 in the B-phase stator portion 130b. This positions the B-phase stator portion 130b relative to the B-phase case 114b in the axial direction.

The B-phase stator portion 130b, which is positioned in the axial direction as described above, is located toward the inner side of the case (toward bottom wall 115 of B-phase case 114b) from an axial end surface 117b of the flange 117, which is the surface of the B-phase case 114b abutting the A-phase case 114a. More specifically, the axial end surface of the B-phase stator portion 130b that is closer to the A-phase stator portion 130a, namely, the inwardly-extending portion 134a and the radially-extending portions 135a (claw poles 135) of the first stator core 131, is located toward the inner side of the case from the axial end surface 117b of the flange 117 of the B-phase case 114b (refer to FIG. 9).

The arrangement of the stator portions 130a and 130b in the first and second stator units 140a and 140b forms a clearance K in the axial direction between the A-phase stator portion 130a and the B-phase stator portion 130b when the first and second stator units 140a and 140b(the cases 114a and 114b) are coupled together (FIG. 7).

The screws 118 fasten together the A-phase case 114a, to which the A-phase stator portion 130a is fixed, and the B-phase case 114b, to which the B-phase stator portion 130b is fixed, with the flanges 117 abut against each other in the axial direction. Each screw 118 is inserted through a screw hole 117c extending through the flange 117 of the case 114a and a screw hole 17d extending through the flange 117 of the case 114b.

Figure 10:
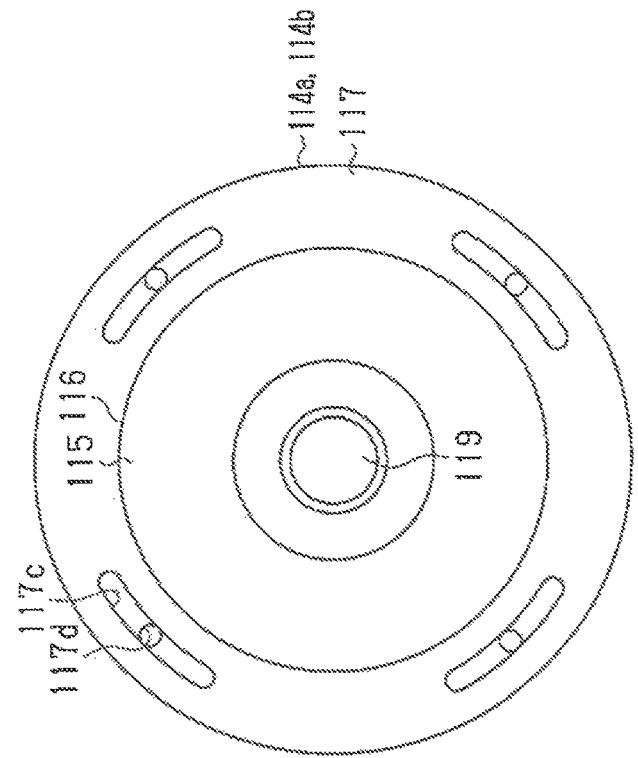
FIG. 10 is a plan view illustrating the coupled state of the first and second stator units shown in FIG. 9.

As shown in FIGS. 9 and 10, each screw hole 117d of the B-phase case 114b is a round hole. Each screw hole 117c of the A-phase case 114a is an elongated hole extending in the circumferential direction of the motor. Thus, the A-phase case 114a can be rotated relative to the B-phase case 114b with the screws 118 inserted into the screw holes 117c and 117d. This allows the circumferential positions of the cases 114a and 114b to be adjusted, which, in turn, allows the relative circumferential positions of the stator portions 130a and 130b to be adjusted. After adjusting the positions, the screws 118 fasten together the flanges 117.

The operation of the second embodiment will now be described.

When the winding 133 of the A-phase stator portion 130a is supplied with A-phase drive current and the winding 133 of the B-phase stator portion 130b is supplied with B-phase drive current, a rotating magnetic field is generated at the stator 112. This rotates the rotor 113, which includes the rotation shaft 119. The A-phase drive current and the B-phase drive current are alternating currents set to have a phase difference of, for example, 90 degrees.

The second embodiment has the advantages described below.

(5) The housing 111 of the motor 110 is formed by coupling together the A-phase case 114a, to which the A-phase stator portion 130a is fixed, and the B-phase case 114b, to which the B-phase stator portion 130b is fixed. When the cases 114a and 114b are coupled to each other, the clearance K is formed between the A-phase stator portion 130a and the B-phase stator portion 130b in the axial direction.

This allows the clearance K (gap) to be formed between the A-phase stator portion 130a and the B-phase stator portion 130b in the axial direction just by preparing the first stator unit 140a, in which the A-phase stator portion 130a is fixed to the A-phase case 114a, and the second stator unit 140b, in which the B-phase stator portion 130b is fixed to the B-phase case 114b and then coupling together the first and second stator units 140a and 140b (cases 114a and 14b). Thus, there is no need for a special component such as a spacer to form a gap in the axial direction between the stator portions 130a and 130b. Thus, while minimizing the number of components, the clearance K between the stator portions 130a and 130b reduces magnetic interference between the stator portions 130a and 130b and improves the motor performance.

(6) The cases 114a and 114b each include a case body (bottom wall 115 and side wall 116), which accommodates the stator portions 130a and 130b, and the flange 117, which extends in the radial direction from the open end of the case body. The flanges 117 are fastened together by the screws 118. Thus, the cases 114a and 114b are easily fixed to each other.

(7) The flange 117 of the A-phase case 114a includes the screw holes 117c, which are elongated holes extending in the circumferential direction and receiving the screws 118. Thus, the circumferential positions of the cases 114a and 114b (i.e., circumferential positions of stator portions 130a and 130b) may be adjusted with the flanges 117 of the cases 114a and 114b abut against each other and the screws 118 inserted into the screw holes 117c and 117d. This is advantageous for obtaining the desired motor characteristics.

(8) The cases 114a and 114b respectively include the abutment portions 141a and 141b that serve as positioning portions for positioning the accommodated stator portions 130a and 130b in the axial direction. This ensures that the clearance K in the axial direction is obtained between the stator portions 130a and 130b.

The second embodiment may be modified as described below.

The cases 114a and 114b may be engaged with each other in the circumferential direction to position the cases 114a and 114b.

For example, as shown in FIG. 1l, in the cases 114a and 114b, the open end of each side wall 116 may include recesses and projections extending in the axial direction. Projections 151a of the A-phase case 114a may be fitted to recesses 152b of the B-phase case 14b, and projections 151b of the B-phase case 114b may be fitted to recesses 152a of the A-phase case 114a. The cases 114a and 114b are engaged with each other in the circumferential direction when the projections 151a and 151b are fitted to the recesses 152a and 152b. This positions the cases 114a and 114b in the circumferential direction. In this case, it is desirable that the stator portions 130a and 130b be positioned in the circumferential direction relative to the corresponding cases 114a and 114b to allow the stator portions 130a and 130b to be positioned relative to each other in the circumferential direction.

Figure 11:
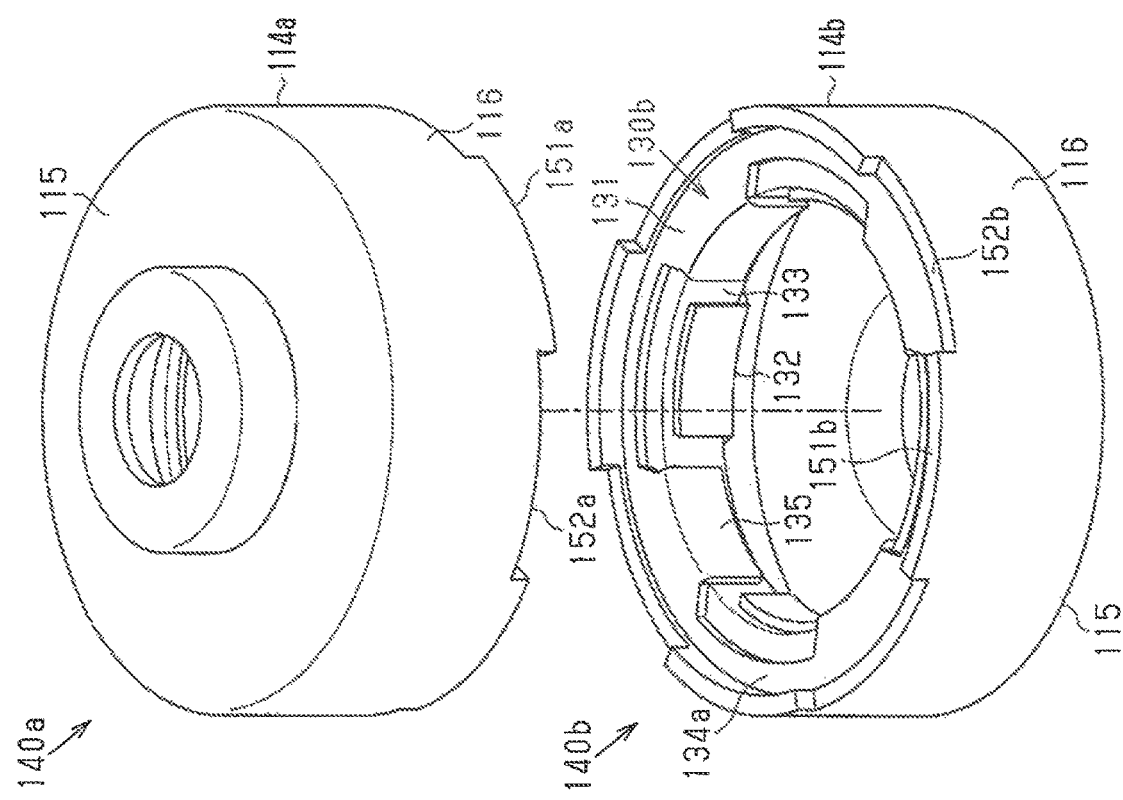
FIG. 11 is a perspective view showing first and second stator units in a further example of the second embodiment.

The structure shown in FIG. 11 does not include the flanges 117 of the cases 114a and 114b. The flange does not necessarily have to be included. When the cases 114a and 114b includes flanges, the flanges may include the projections 151a and 151b and the recesses 152a and 152b. In the structure shown in FIG. 11, the cases 114a and 114b include the projections 151a and 151b and the recesses 152a and 152b. Instead, one of the cases 114a and 114b may include a projection, and the other one of the cases 14a and 114b may include a recess.

In the second embodiment, the screw holes 117c of the A-phase case 114a are elongated holes extending in the circumferential direction. Instead, the screw holes 117d of the B-phase case 114b may be elongated holes. Alternatively, the screw holes 117c and 117d may both be elongated holes.

In the second embodiment, the screws 118 fasten together the cases 114a and 114b. However, the cases 114a and 114b may be fastened to each other by a fastening means other than screws.

The number of poles (number of claw poles) of the rotor 113 and the number of poles (number of claw poles) of the stator 112 does not have to be as illustrated in the second embodiment and may be changed in accordance with the structure.

The structure, including shape, of the cases 114a and 114b does not have to be as illustrated in the second embodiment and may be changed in accordance with the structure.

In the second embodiment, the rotor 113 includes the rotor units 120a and 120b that have Lundell constructions. The present invention may also be applied to an SPM or IPM rotor.

A third embodiment according to the present invention will now be described with reference to FIGS. 12 to 16.

Figure 12:
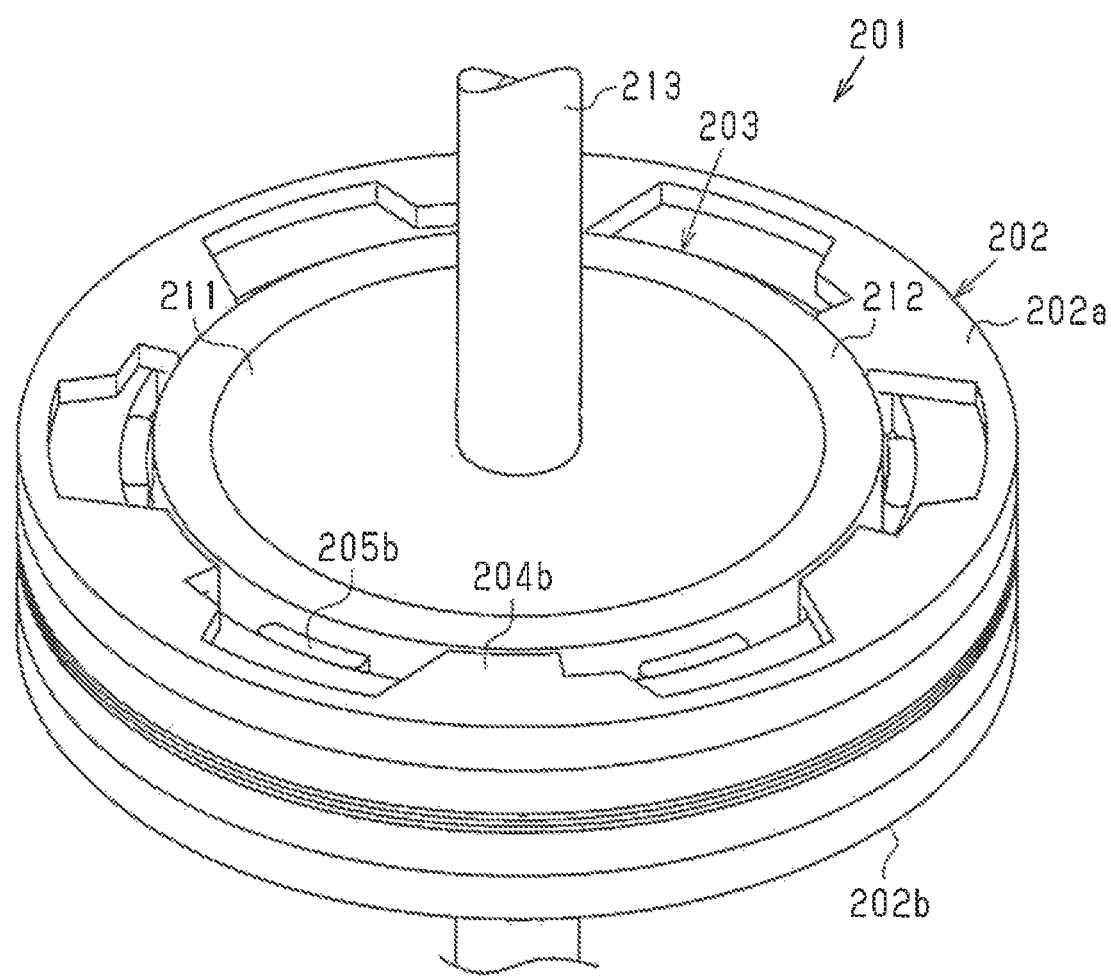
FIG. 12 is a perspective view of a motor according to a third embodiment of the present invention.

As shown in FIG. 12, a motor 201 of the present embodiment includes an annular stator 202 and a rotor 203 that is rotationally supported at the inner side of the stator 202.

Figure 13:
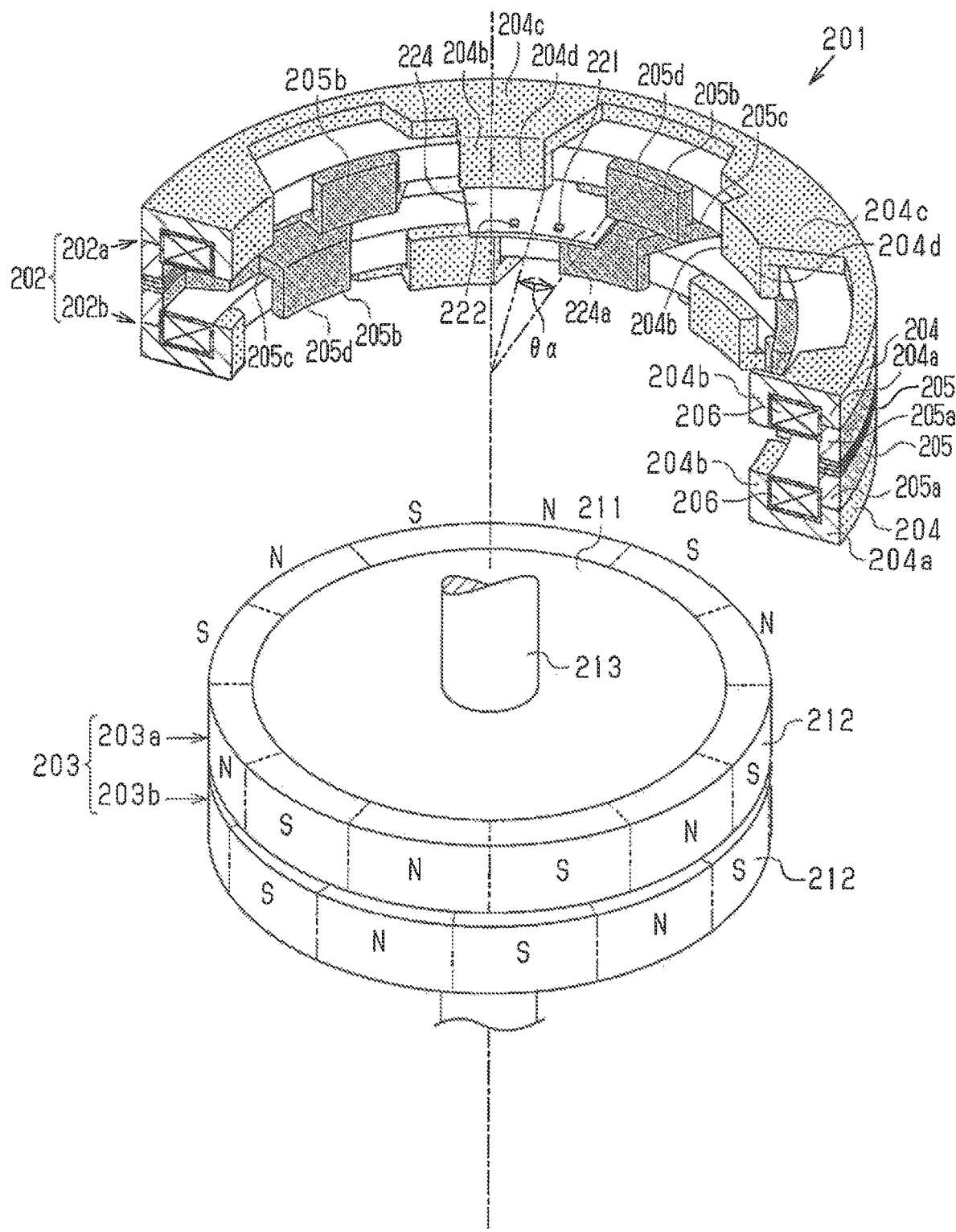
FIG. 13 is a partially exploded perspective view of the motor shown in FIG. 12.

As shown in FIG. 13, the stator 202 includes an A-phase stator unit 202a and a B-phase stator unit 202b that have Lundell constructions. The A-phase stator unit 202a and the B-phase stator unit 202b are arranged next to each other (stacked) in the axial direction. Further, the rotor 203 includes an A-phase rotor unit 203a and the B-phase rotor unit 203b, both of which are of surface magnet types. The A-phase rotor unit 203a and the B-phase rotor unit 203b are arranged next to each other (stacked) in the axial direction.

The A-phase stator unit 202a and the B-phase stator unit 202b of the stator 202, which have the same structure, each include a first stator core 204, a second stator core 205, and a winding 206. The first stator core 204 includes an annular outer wall 204a and first claw poles 204b. Each first claw pole 204b includes a radially-extending portion 204c, which extends inwardly in the radial direction from an axial end of the annular outer wall 204a, and a pole portion 204d, which extends in the axial direction from the distal end of the radially-extending portion 204c. Further, the second stator core 205 includes an annular outer wall 205a and second claw poles 205b. Each second claw pole 205b includes a radially-extending portion 205c, which extends inwardly in the radial direction from an axial end of the annular outer wall 205a, and a pole portion 205d, which extends in the axial direction from the distal end of the radially-extending portion 205c.

The first stator core 204 and the second stator core 205 are coupled together with the first claw poles 204b and the second claw poles 205b alternately arranged in the circumferential direction and the winding 206 held between the radially-extending portions 204c and 205c. This forms the twelve pole portions 204d and 205d in the circumferential direction. In the present embodiment, the A-phase stator unit 202a and the B-phase stator unit 202b are arranged next to each other in the axial direction so that their second stator cores 205 oppose (face) each other and so that the lower B-phase stator unit 202b (lower in FIG. 13) is shifted by an electrical angle of 45° in the counterclockwise direction from the upper A-phase stator unit 202a.

Figure 14:
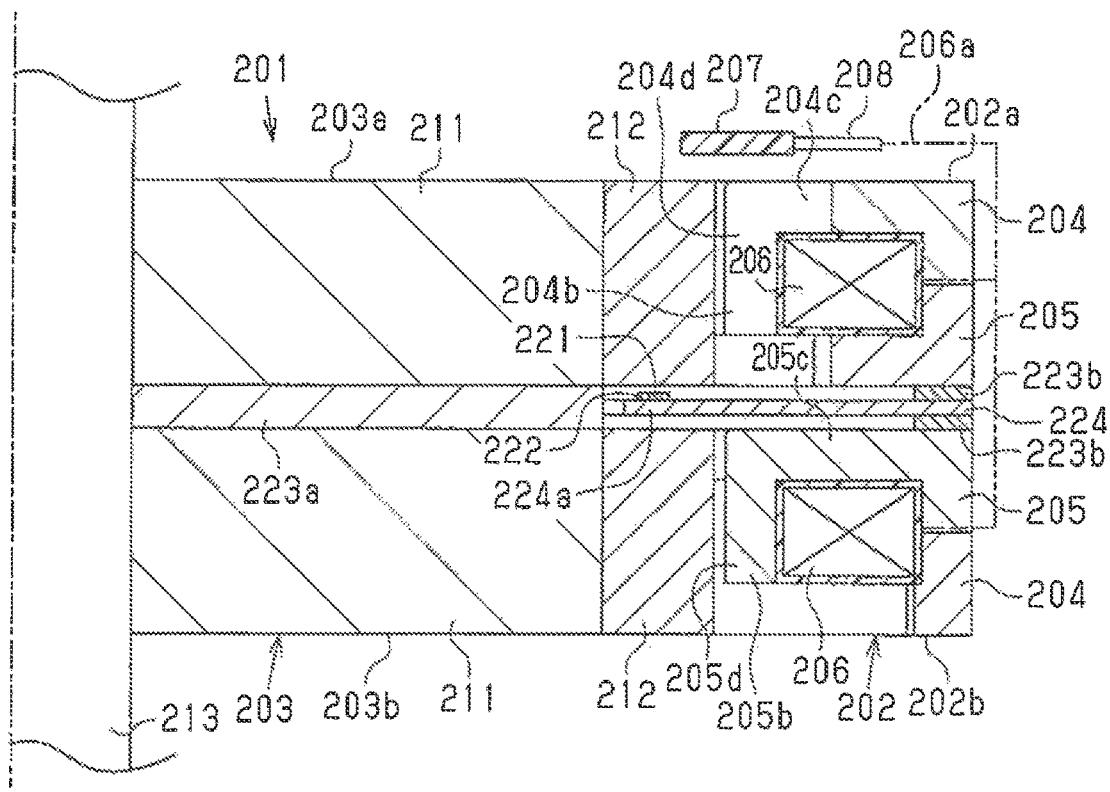
FIG. 14 is a partially cross-sectional view of the motor shown in FIG. 12.

As shown in FIG. 14, in the present embodiment, an end portion 206a of each winding 206 is drawn outwardly in the radial direction from the first and second stator cores 204 and 205 and electrically connected to a connection terminal 208 of a drive circuit board 207, which is arranged on a housing cover (not shown) of the motor 201.

Figure 15:
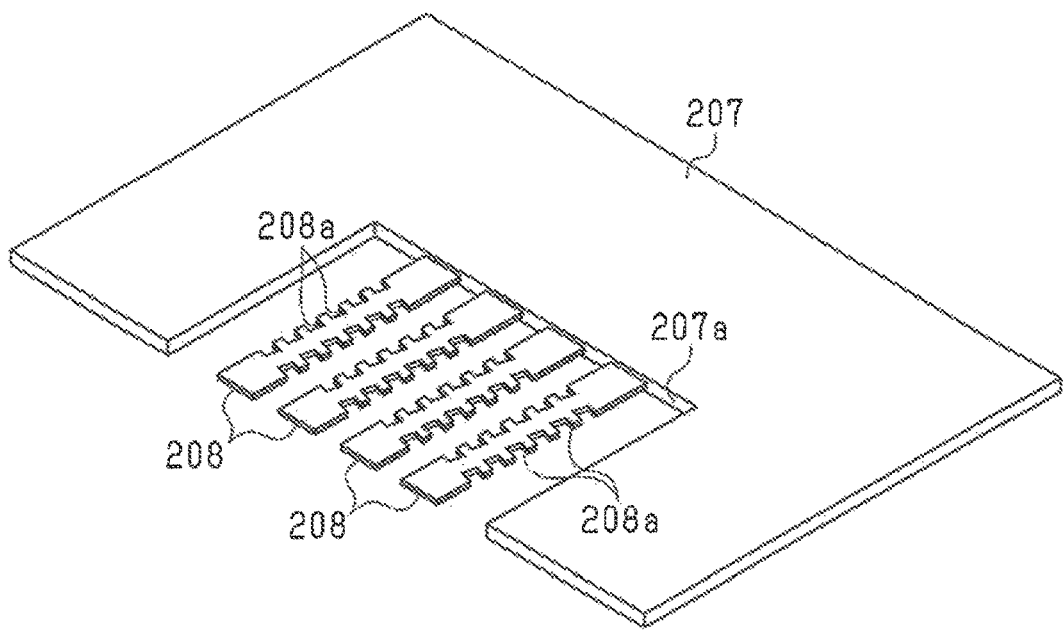
FIG. 15 is a perspective view of a drive circuit board shown in FIG. 14.

As shown in FIG. 15, the drive circuit board 207 of the present embodiment includes a recess 207a and is generally C-shaped as viewed in a direction orthogonal to the plane of the drive circuit board 207. The connection terminals 208 project from the bottom of the recess 207a, as viewed in the direction orthogonal to the plane of the drive circuit board 207, and are located in the recess 207a.

Figure 16:
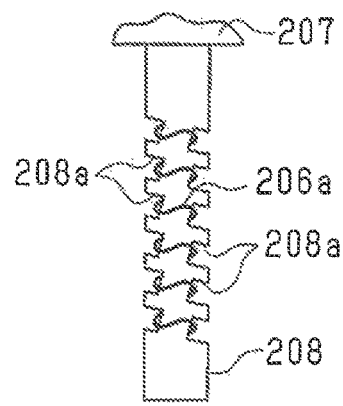
FIG. 16 is a plan view of a connection terminal shown in FIG. 15.

As shown in FIG. 16, each connection terminal 208 of the present embodiment includes the grooves 208a extending in the sideward direction as viewed in the direction orthogonal to the plane of the drive circuit board 207. The winding 206 has an end portion 206a that is wound (spirally) around the connection terminals 208 so as to be fitted into the grooves 208a. The coating is removed from the portion around which the winding 206 is wound to electrically connect the winding 206 to the connection terminals 208.

As shown in FIGS. 13 and 14, the A-phase rotor unit 203a and the B-phase rotor unit 203b, which form the rotor 203, have the same structure and each include a disk-shaped the rotor core 211, and an annular permanent magnet 212, which is fixed to the outer circumference of the rotor core 211 and opposed to the pole portions 204d and 205d in the radial direction. The permanent magnet 212 is magnetized so that twelve magnetic poles (N-poles and S-poles) are arranged in the circumferential direction. A rotation shaft 213 is press-fitted into the center hole of each rotor core 211. The rotation shaft 213 is rotationally supported by a housing (not shown). The A-phase rotor unit 203a and the B-phase rotor unit 203b are arranged in the present embodiment so that the lower (as viewed in FIG. 13) B-phase rotor unit 203b is shifted by an electrical angle of 45° in the clockwise direction from the upper A-phase rotor unit 203a.

The motor 201 of the present embodiment includes an A-phase sensor 221 and a B-phase sensor 222 that are located between the permanent magnets 212 of the rotor 203 in the axial direction to detect the magnetic flux of the permanent magnet 212.

In detail, as shown in FIG. 14, the A-phase rotor unit 203a and the B-phase rotor unit 203b of the rotor 203 are arranged next to one another with a disk-shaped rotor spacer 223a located between the rotor cores 211 in the axial direction. This forms a clearance in the axial direction between the permanent magnet 212 of the A-phase rotor unit 203a from the permanent magnet 212 of the B-phase rotor unit 203b.

Further, in the stator 202, a base plate 224 is located between the A-phase stator unit 202a and the B-phase stator unit 202b in the axial direction. The base plate 224 is held between two disk-shaped stator spacers 223b in the axial direction. The base plate 224 includes an inner extension 224a, which extends inwardly in the radial direction to the portion (clearance) between the permanent magnets 212. The A-phase sensor 221 and the B-phase sensor 222 are located on the distal portion of the inner extension 224a. In the present embodiment, the A-phase sensor 221 and the B-phase sensor 222 are Hall ICs. The A-phase sensor 221 detects the magnetic flux of the permanent magnet 212 of the A-phase rotor unit 203a. The B-phase sensor 222 detects the magnetic flux of the permanent magnet 212 of the B-phase rotor unit 203b.

Further, as shown in FIG. 13, the A-phase sensor 221 is arranged within a circumferential angular range θa between the pole portions 204d and 205d that are adjacent to each other in the circumferential direction in the A-phase stator unit 202a corresponding to the permanent magnet 212 detected by the A-phase sensor 221. In the present embodiment, the A-phase sensor 221 is located at a center position between the pole portions 204d and 205d in the circumferential direction. Further, the B-phase sensor 222 is arranged within a circumferential angular range between the pole portions 204d and 205d that are adjacent to each other in the circumferential direction in the B-phase stator unit 202b corresponding to the permanent magnet 212 detected by the B-phase sensor 222. In the present embodiment, the B-phase sensor 222 is located at a center position between the pole portions 204d and 205d. A signal wire (not shown) extending from the base plate 224 electrically connects the A-phase sensor 221 and the B-phase sensor 222 to the drive circuit board 207.

The operation of the motor 201 in the third embodiment will now be described.

When the winding 206 is supplied with drive current from the drive circuit board 207, a rotating magnetic field is generated at the stator 202 (A-phase stator unit 202a and B-phase stator unit 202b), and the rotor 203 (A-phase rotor unit 203a and B-phase rotor unit 203b) are rotated. Here, the A-phase sensor 221 and the B-phase sensor 222 detect the magnetic flux of each permanent magnet 212, and the drive circuit supplies each winding 206 with drive current at a suitable timing in accordance with the magnetic flux detection signal. This generates a satisfactory rotating field and rotates the rotor 203 in a satisfactory manner.

The third embodiment has the advantages described below.

(9) The A-phase sensor 221 and the B-phase sensor 222 that detect the magnetic flux of the permanent magnet 212 of the corresponding A-phase rotor unit 203a and B-phase rotor unit 203b are located between the permanent magnets 212 in the axial direction. This limits the influence of the magnetic flux of the stator 202 as compared with when, for example, the stators are arranged opposing the axial ends of the rotor 203 and allows the magnetic flux of the permanent magnets 212 to be accurately detected (in a form close to sine wave). Thus, for example, the rotational angle of the rotor 203 (A-phase rotor unit 203*a* and B-phase rotor unit 203*b*) can be accurately detected. This, in turn, allows the rotor 203 to be rotated in a satisfactory manner.

(10) The A-phase sensor 221 is arranged within a circumferential angular range θc between the pole portions 204*d* and 205*d* that are adjacent to each other in the circumferential direction in the A-phase stator unit 202*a* corresponding to the permanent magnet 212 detected by the A-phase sensor 221. Further, the B-phase sensor 222 is arranged within a circumferential angular range between the pole portions 204*d* and 205*d* that are adjacent to each other in the circumferential direction in the B-phase stator unit 202*b* corresponding to the permanent magnet 212 detected by the B-phase sensor 222. This limits the influence of the magnetic flux of the pole portions 204*d* and 205*d* of the stator 202 (A-phase stator unit 202*a* and B-phase stator unit 202*b*) on the A-phase sensor 221 and the B-phase sensor 222 the stator 202 and allows the magnetic flux of the permanent magnets 212 to be accurately detected.

(11) The A-phase sensor 221 and the B-phase sensor 222 include the base plate 224 located between the A-phase stator unit 202*a* and the B-phase stator unit 202*b* in the axial direction. This facilitates the arrangement of the A-phase sensor 221 and the B-phase sensor 222.

(12) The end portion 206*a* of the winding 206 is wound (spirally) around the connection terminals 208 and electrically connected to the connection terminals 208. This allows the end portion 206*a* of the winding 206 to be easily and securely connected to the connection terminals 208. Further, the connection terminals 208 include the grooves 208*a*, and the end portion 206*a* of the winding 206 is wound around the connection terminals 208 (spirally) so as to be fitted to the grooves 208*a*. This allows the end portion 206*a* of the winding 206 to be further easily and securely connected to the connection terminals 208. Additionally, the drive circuit board 207 includes the recess 207*a* and is generally C-shaped as viewed in a direction orthogonal to the plane of the drive circuit board 207, and the connection terminals 208 project from the bottom of each recess 207*a* and are accommodated in the recess 207*a* as viewed in a direction orthogonal to the plane of the drive circuit board 207. This reduces the thickness of the drive circuit board 207 as compared to a structure in which, for example, the connection terminals 208 project from the plane of the drive circuit board 207.

The third embodiment may be modified as described below.

In the above embodiment, the A-phase sensor 221 is arranged within a circumferential angular range θa between the pole portions 204*d* and 205*d* that are adjacent to each other in the circumferential direction in the A-phase stator unit 202*a* corresponding to the permanent magnet 212 detected by the A-phase sensor 221. Instead, the A-phase sensor 221 may be arranged outside the angular range θa. Further, in the same manner, the B-phase sensor 222 may be arranged outside the circumferential angular range between the pole portions 204*d* and 205*d*.

In the present embodiment, the A-phase sensor 221 and the B-phase sensor 222 are arranged on the base plate 224, which is located between the A-phase stator unit 202*a* and the B-phase stator unit 202*b* in the axial direction. However, this structure may be changed to another structure as long as the A-phase sensor 221 and the B-phase sensor 222 are located between the permanent magnets 212 in the axial direction.

In the above embodiment, the drive circuit board 207 that includes the drive circuit is separate from the base plate 224 that includes the A-phase sensor 221 and the B-phase sensor 222. Instead, for example, the drive circuit may be arranged on the base plate 224. This eliminates the need for the drive circuit board 207 and reduces the number of boards. Further, since the base plate 224 would be located between the A-phase stator unit 202*a* and the B-phase stator unit 202*b* in the axial direction, the base plate 224 may be located close to both of the windings 206, and the connection of the base plate 224 and each winding 206 is facilitated.

Although not particularly mentioned in the above embodiment, the A-phase sensor 221 and the B-phase sensor 222 may be arranged so that their detection surfaces are orthogonal to the detection surface. This allows for accurate detection of the magnetic flux of the permanent magnets 212. Needless to say, the A-phase sensor 221 and the B-phase sensor 222 may be arranged so that their detection surfaces are orthogonal to the axial direction.

In the above embodiment, the shape and structure of the connection terminals 208 may be changed.

Figure 17:
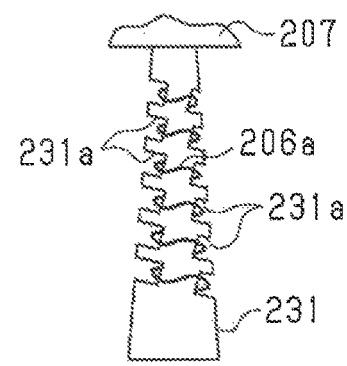
FIG. 17 is a plan view of a connection terminal in a further example of the third embodiment.

For example, as shown in FIG. 17, the connection terminals 208 may be modified so that grooves 231*a* are arranged in the two lateral sides of the connection terminals 208 as viewed in a direction orthogonal to the plane of the drive circuit board 207. Additionally, a connection terminal 231 may be increased in width as the distal end becomes closer.

Figure 18:
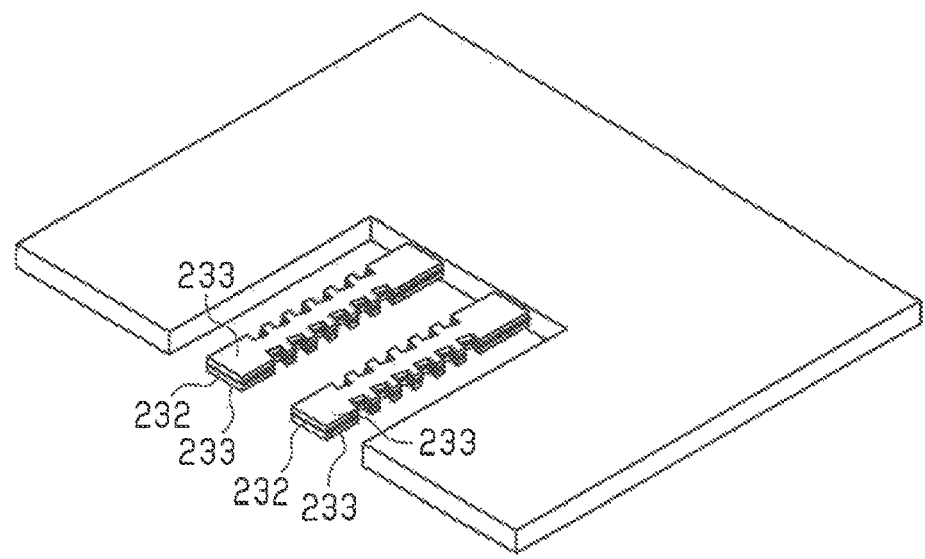
FIG. 18 is a perspective view of a drive circuit board in a further example of the third embodiment.

Further, for example, the connection terminals 208 may be modified to the structure shown in FIG. 18. In this structure, an insulator 232 (shown by bolded lines) is held between two connection terminals 233. The end portions 206*a* of each winding 206 (e.g., initial end portion 206*a* and terminal end portion 206*a* of winding 206 of A-phase stator unit 202*a*) are alternately wound around the two connection terminals 233. To electrically connect each end portion 206*a* to the designated connection terminal 233, the coating is removed from only the end portion 206*a* that corresponds to the connected connection terminal 233.

In the above embodiment, the connection terminals 208 are arranged on the plane of the drive circuit board 207. However, the end portion 206*a* of the winding 206 may be connected to the drive circuit board through a different structure.

Figure 19:
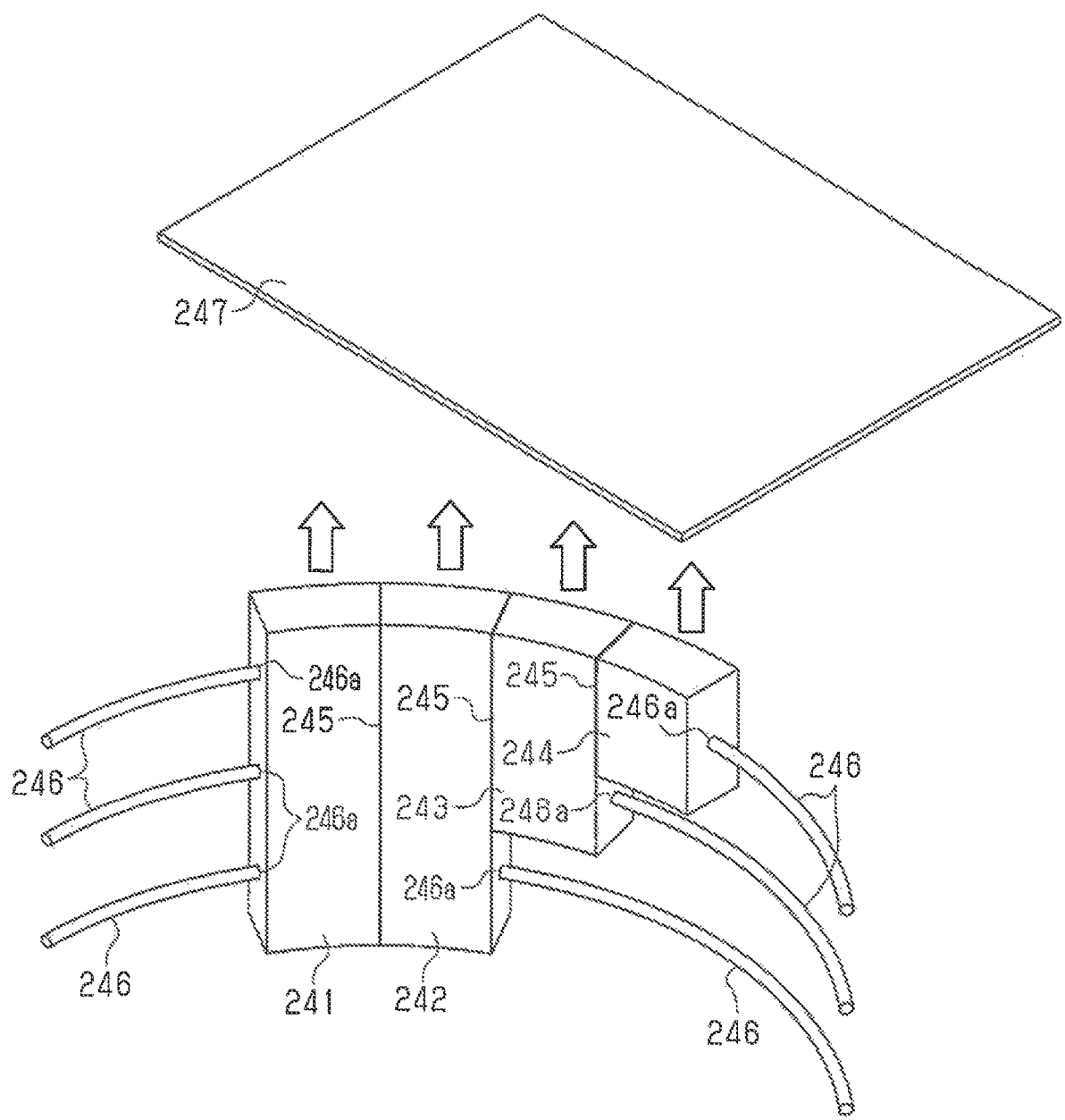
FIG. 19 is an exploded perspective view illustrating a connecting structure in a further example of the third embodiment.

For example, a modification may be made as shown in FIG. 19. In this example, connection terminals 241 to 244 extending in the axial direction of the motor 201 are arranged next to one another in an annular manner so as to be accommodated between the outer circumference of the stator 202 and a housing (not shown). Insulators 245 (shown by bolded lines) are located between the connection terminals 241 to 244 in the circumferential direction. The connection terminals 241 to 244 have different lengths to expose the circumferential end faces of the connection terminals 241 to 244. Ends 246*a* of windings 246 are connected to the exposed surfaces. The axial upper ends of the connection terminals 241 to 244 are electrically connected to an upper drive circuit board 247. This example (refer to FIG. 19) is for a motor including three stator units (three phases). One end portion 246*a* of the winding 246 for each phase is connected to the connection terminal 241 that serves as a neutral point, and the other end portion 246*a* of the winding 246 for each phase is connected to the corresponding one of the connection terminals 242 to 244.

The above embodiments and modified examples may be combined.

The invention claimed is:

1. A motor comprising:
   a two-layer rotor including an A-phase rotor and a B-phase rotor that are stacked together, wherein
   the A-phase rotor includes two rotor cores, each including claw poles arranged at equal angular intervals, and a field magnet, which is located between the two rotor cores, and
   the B-phase rotor includes two rotor cores, each including claw poles arranged at equal angular intervals, and a field magnet, which is located between the two rotor cores;
   a two-layer stator including an A-phase stator and a B-phase stator that are stacked together, wherein
   the A-phase stator includes two stator cores, each including claw poles arranged at equal angular intervals, and an A-phase winding, which is located between the two stator cores, and
   the B-phase stator includes two stator cores, each including claw poles arranged at equal angular intervals, and a B-phase winding, which is located between the two stator cores; and
   a control unit that controls an A-phase input voltage that is applied to the A-phase winding and a B-phase input voltage that is applied to the B-phase winding, wherein
   the A-phase stator and the A-phase rotor are arranged relative to the B-phase stator and the B-phase rotor at an electrical angle of 90 degrees, and
   the control unit advances an angular phase of the A-phase input voltage from its basic voltage waveform and an angular phase of the B-phase input voltage from its basic voltage waveform and sets an excitation width to 180 degrees or less.

2. A method for controlling a motor, wherein the motor includes
   a two-layer rotor including an A-phase rotor and a B-phase rotor that are stacked together, wherein
   the A-phase rotor includes two rotor cores, each including claw poles arranged at equal angular intervals, and a field magnet, which is located between the two rotor cores, and
   the B-phase rotor includes two rotor cores, each including claw poles arranged at equal angular intervals, and a field magnet, which is located between the two rotor cores;
   a two-layer stator including an A-phase stator and a B-phase stator that are stacked together, wherein
   the A-phase stator includes two stator cores, each including claw poles arranged at equal angular intervals, and an A-phase winding, which is located between the two stator cores, and
   the B-phase stator includes two stator cores, each including claw poles arranged at equal angular intervals, and a B-phase winding, which is located between the two stator cores, wherein the A-phase stator and the A-phase rotor are arranged relative to the B-phase stator and the B-phase rotor at an electrical angle of 90 degrees;
   the method comprising:
   applying A-phase input voltage to the A-phase winding;
   applying B-phase input voltage to the B-phase winding; and
   setting a phase angle of each of the A-phase input voltage and the B-phase input voltage that is advanced by 24 to 42 degrees from a corresponding basic voltage waveform and setting an excitation width of the A-phase input voltage and the B-phase input voltage to 150 to 170 degrees.

3. A method for controlling a motor, wherein the motor includes
   a two-layer rotor including an A-phase rotor and a B-phase rotor that are stacked together, wherein
   the A-phase rotor includes two rotor cores, each including claw poles arranged at equal angular intervals, and a field magnet, which is located between the two rotor cores, and
   the B-phase rotor includes two rotor cores, each including claw poles arranged at equal angular intervals, and a field magnet, which is located between the two rotor cores;
   a two-layer stator including an A-phase stator and a B-phase stator that are stacked together, wherein
   the A-phase stator includes two stator cores, each including claw poles arranged at equal angular intervals, and an A-phase winding, which is located between the two stator cores, and
   the B-phase stator includes two stator cores, each including claw poles arranged at equal angular intervals, and a B-phase winding, which is located between the two stator cores, wherein the A-phase stator and the A-phase rotor are arranged relative to the B-phase stator and the B-phase rotor at an electrical angle of 90 degrees;
   the method comprising:
   applying A-phase input voltage to the A-phase winding;
   applying B-phase input voltage to the B-phase winding; and
   setting a phase angle of each of the A-phase input voltage and the B-phase input voltage that is advanced by 0 to 36 degrees (0 degrees exclusive) from a corresponding basic voltage waveform and setting an excitation width of the A-phase input voltage and the B-phase input voltage to 155 to 180 degrees.

4. A method for controlling a motor, wherein the motor includes
   a two-layer rotor including an A-phase rotor and a B-phase rotor that are stacked together, wherein
   the A-phase rotor includes two rotor cores, each including claw poles arranged at equal angular intervals, and a field magnet, which is located between the two rotor cores, and
   the B-phase rotor includes two rotor cores, each including claw poles arranged at equal angular intervals, and a field magnet, which is located between the two rotor cores;
   a two-layer stator including an A-phase stator and a B-phase stator that are stacked together, wherein
   the A-phase stator includes two stator cores, each including claw poles arranged at equal angular intervals, and an A-phase winding, which is located between the two stator cores, and
   the B-phase stator includes two stator cores, each including claw poles arranged at equal angular intervals, and a B-phase winding, which is located between the two stator cores, wherein the A-phase stator and the A-phase rotor are arranged relative to the B-phase stator and the B-phase rotor at an electrical angle of 90 degrees;
   the method comprising:
   applying A-phase input voltage to the A-phase winding;
   applying B-phase input voltage to the B-phase winding; and setting a phase angle of each of the A-phase input voltage and the B-phase input voltage that is advanced by 24 to 36 degrees from a corresponding basic voltage waveform and setting an excitation width of the A-phase input voltage and the B-phase input voltage to 155 to 170 degrees.

5. A motor controller that performs the method for controlling a motor according to claim 2, wherein the motor controller is configured to control the motor by generating the A-phase input voltage and the B-phase input voltage set by the method.

6. A motor comprising:
a stator including two stator units arranged in an axial direction, wherein the stator units each include
two stator cores, each including claw poles arranged in a circumferential direction, and
a winding located between the stator cores in the axial direction; and
a housing that accommodates the stator, wherein
the housing includes a first case and a second case that are coupled together,
one of the stator units is fixed to the first case,
the other one of the stator units is fixed to the second case, and
in a state in which the first and second cases are coupled together, a clearance exists between the two stator units in the axial direction.

7. The motor according to claim 6, wherein:
the first and second cases each include a case body, which accommodates the corresponding stator unit, and a flange, which extends from an open end of the case body in a radial direction; and
the flange of the first case is fixed to the flange of the second case by a screw.

8. The motor according to claim 7, wherein
the flange of at least one of the first and second cases includes a hole through which the screw is inserted, and
the hole is an elongated hole extending in the circumferential direction.

9. The motor according to claim 6, wherein
the first case includes a projection that projects in the axial direction,
the second case includes a recess that is recessed in the axial direction, and
the projection and the recess are fitted together so that the first case and the second case are engaged with each other in the circumferential direction.

10. The motor according to claim 6, wherein the first and second cases each include a positioning portion for positioning the accommodated stator unit in the axial direction.

11. A motor comprising:
a stator including stator units that are arranged in an axial direction, wherein the stator units each include a first stator core, a second stator core, and a winding located between the first stator core and the second stator core, wherein the first stator core and the second stator core each include a claw pole, and the claw pole includes a radially-extending portion that extends in a radial direction and a pole portion that extends from a distal end of the radially-extending portion in the axial direction;
a rotor including rotor units that are arranged in the axial direction, wherein the number of the rotor units is the same as the number of the stator units, and the rotor units each include a permanent magnet opposing the pole portion;
a sensor located between the permanent magnets in the axial direction, wherein the sensor detects magnetic flux of the permanent magnets.

12. The motor according to claim 11, wherein the sensor is arranged within a circumferential angular range between the pole portions that are adjacent to each other in the circumferential direction in the stator unit corresponding to the permanent magnet detected by the sensor.

13. The motor according to claim 11, further comprising a board located between the stator units in the axial direction, wherein the sensor is arranged on the board.

14. The motor according to claim 13, wherein the board includes a drive circuit that supplies drive current to the winding.

15. The motor according to claim 11, wherein
the sensor includes a detection surface, and
the sensor is arranged so that the detection surface is orthogonal to a circumferential direction.

* * * * *